(12) United States Patent
Aichi

(10) Patent No.: US 11,143,900 B2
(45) Date of Patent: Oct. 12, 2021

(54) ACTIVE MATRIX SUBSTRATE, METHOD FOR MANUFACTURING SAME AND IN-CELL TOUCH PANEL DISPLAY DEVICE

(71) Applicant: Sharp Kabushiki Kaisha, Sakai (JP)

(72) Inventor: Hiroshi Aichi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/073,440

(22) Filed: Oct. 19, 2020

(65) Prior Publication Data

US 2021/0124198 A1 Apr. 29, 2021

Related U.S. Application Data

(60) Provisional application No. 62/926,593, filed on Oct. 28, 2019.

(51) Int. Cl.
*G02F 1/1333* (2006.01)
*G02F 1/1343* (2006.01)

(52) U.S. Cl.
CPC .... *G02F 1/13338* (2013.01); *G02F 1/133345* (2013.01); *G02F 1/134336* (2013.01); *G02F 2201/121* (2013.01); *G02F 2201/123* (2013.01)

(58) Field of Classification Search
CPC .......... G02F 1/13338; G02F 1/133345; G02F 1/136213
See application file for complete search history.

(56) References Cited

U.S. PATENT DOCUMENTS

| 2014/0028942 A1* | 1/2014 | Takeuchi .......... G02F 1/133345 349/43 |
| 2015/0036090 A1* | 2/2015 | Seo .................. G02F 1/136213 349/106 |
| 2016/0253030 A1 | 9/2016 | Tada et al. |
| 2019/0196638 A1 | 6/2019 | Tominaga et al. |

FOREIGN PATENT DOCUMENTS

| JP | 2015-206830 A | 11/2015 |
| WO | 2015/059995 A1 | 4/2015 |
| WO | 2017/213173 A1 | 12/2017 |

* cited by examiner

*Primary Examiner* — Mariam Qureshi
(74) *Attorney, Agent, or Firm* — Keating & Bennett LLP

(57) ABSTRACT

An active matrix substrate includes a thin film transistor, a pixel electrode, a transparent capacitor portion including the pixel electrode, and when viewed from a direction normal to the substrate, a drain contact region where a drain electrode and a semiconductor layer are in contact with each other in a drain opening portion does not overlap either a first contact region where a connecting electrode and the drain electrode are in contact with each other in the first opening portion or a second contact region where the pixel electrode and the connecting electrode are in contact with each other in the second opening portion, the entirety of the second contact region overlaps the first contact region, and the transparent capacitor portion at least partially overlaps the first contact region.

14 Claims, 21 Drawing Sheets

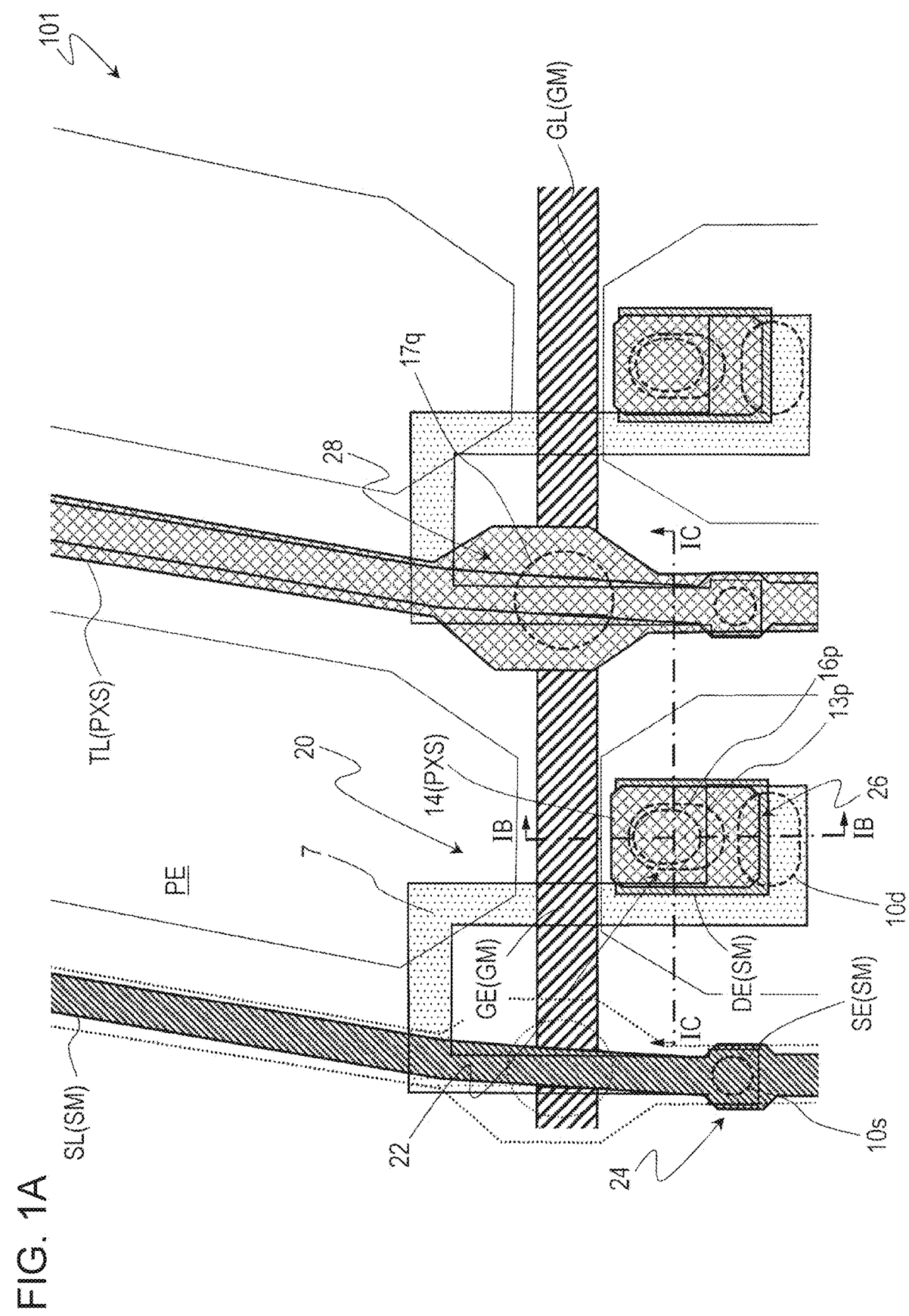

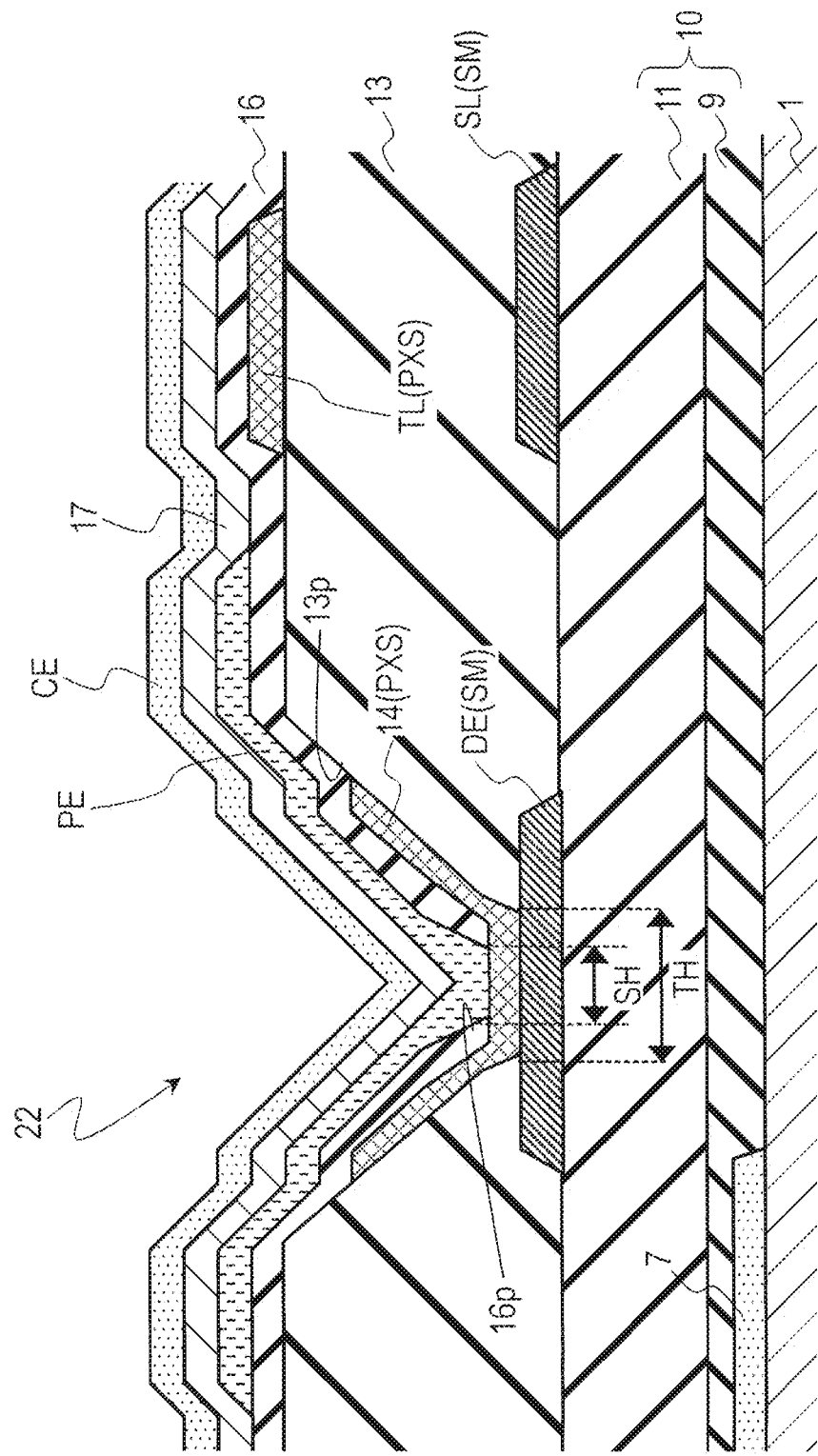

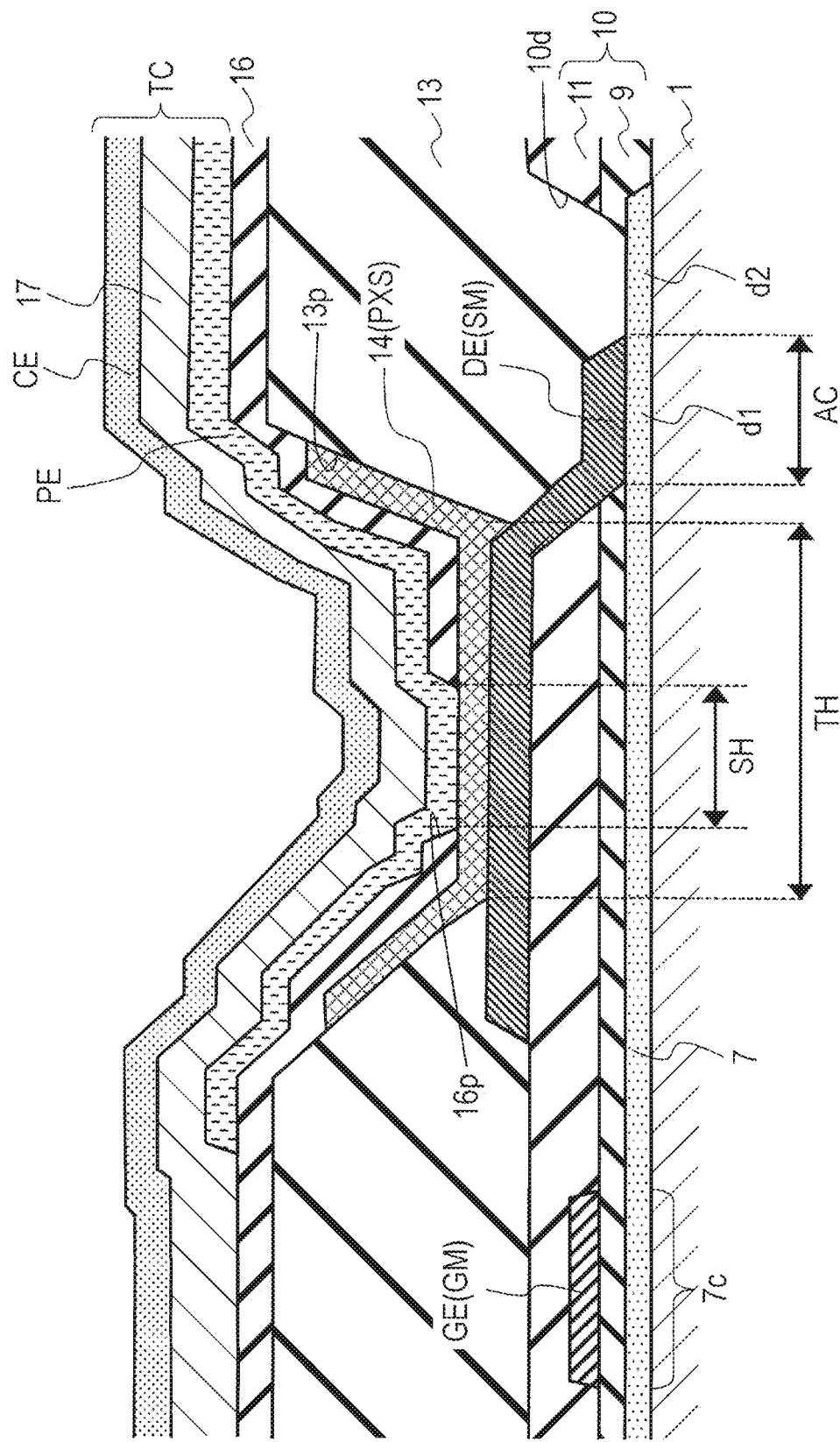

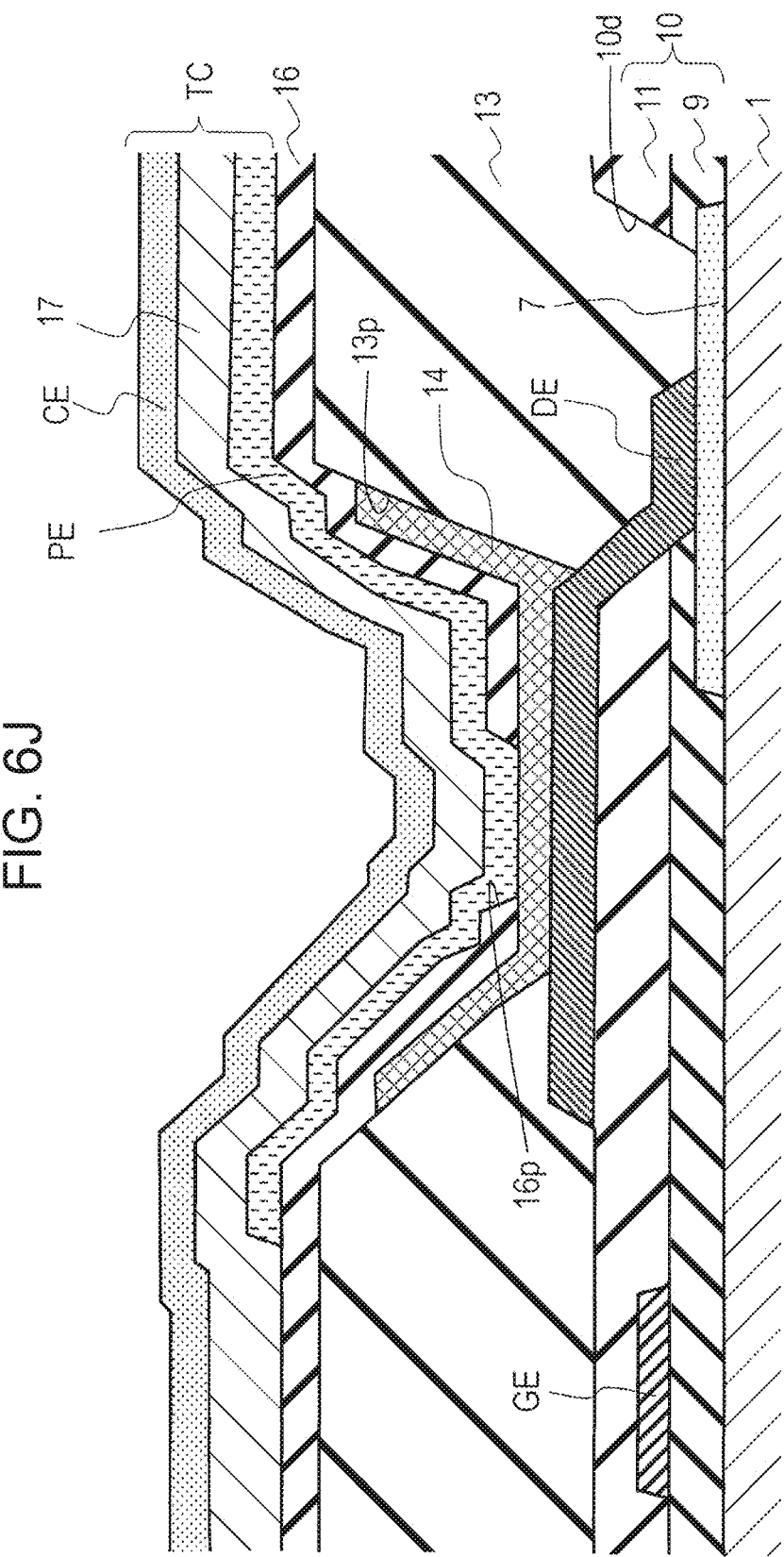

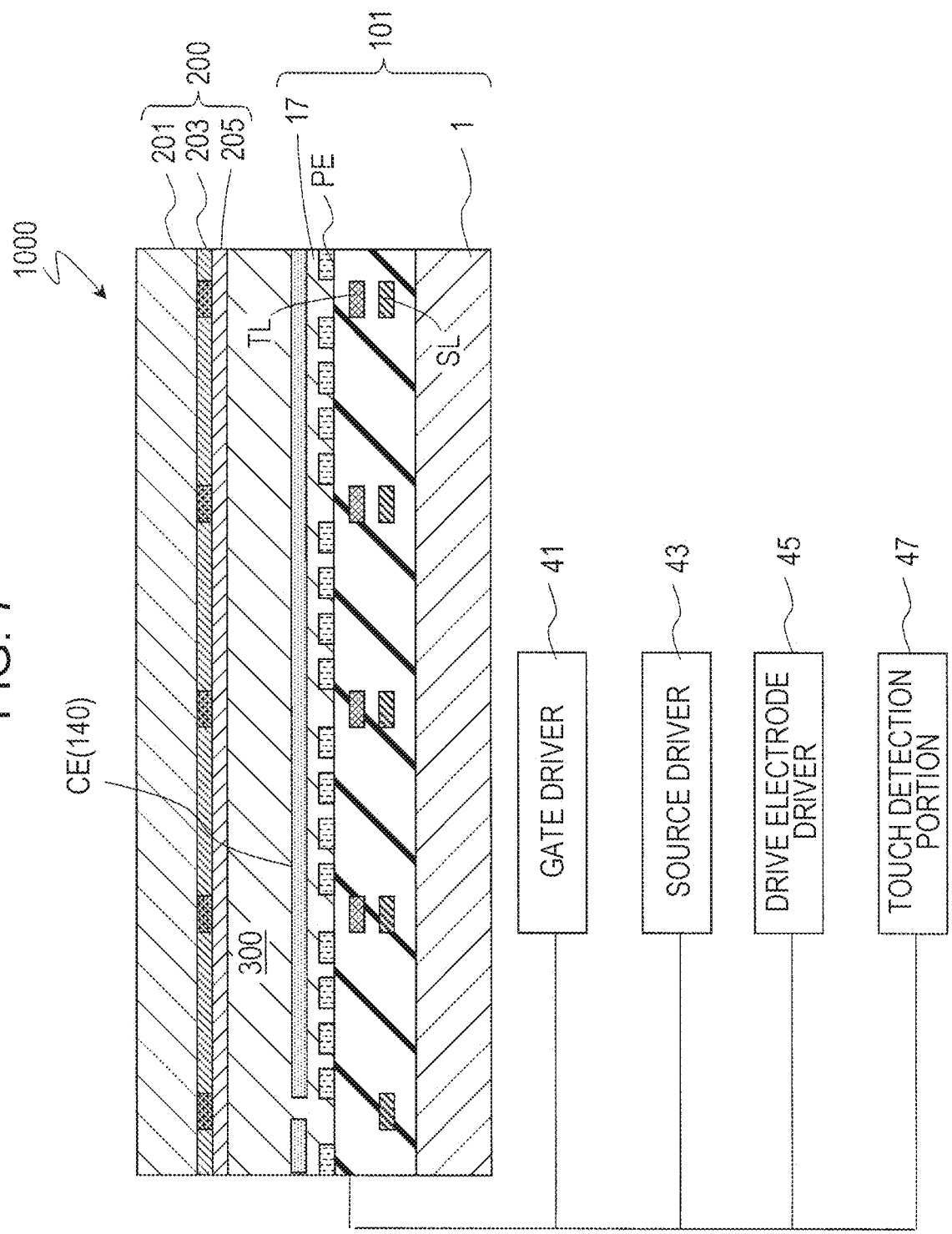

ACTIVE MATRIX SUBSTRATE, METHOD FOR MANUFACTURING SAME AND IN-CELL TOUCH PANEL DISPLAY DEVICE

BACKGROUND

1. Field

The present disclosure relates to an active matrix substrate, a method for manufacturing the same, and an in-cell touch panel display device.

2. Description of the Related Art

In a display device including an active matrix substrate, a pixel electrode and a switching element are provided for each of pixels. As the switching element, for example, a thin film transistor (hereinafter, "TFT") is used. It has been proposed to use an oxide semiconductor instead of amorphous silicon or polycrystalline silicon as a material for an active layer of the TFT. In this specification, a portion of the active matrix substrate corresponding to the pixel of the display device may be referred to as a "pixel region" or a "pixel".

As an operation mode of an active matrix display device, a lateral electric field mode such as a fringe field switching (FFS) mode and an in-plane-switching (IPS) mode may be adopted. In the lateral electric field type, a pair of electrodes (pixel electrode and common electrode) is provided on the active matrix substrate and an electric field is applied to liquid crystal molecules in a direction parallel to a substrate surface (lateral direction). At least a portion of the pixel electrode of each of the pixels is disposed so as to overlap the common electrode with a dielectric layer therebetween. Therefore, a capacitor is formed in a portion where the pixel electrode and the common electrode overlap each other. The capacitor can have a function as an auxiliary capacitor (hereinafter, referred to as "transparent auxiliary capacitor") in the display device.

In a case where the active matrix substrate is applied to a display device with a built-in touch sensor function (hereinafter, "in-cell touch panel display device"), electrodes of a touch sensor (drive electrode or detection electrode) may be provided on the active matrix substrate. For example, in the lateral electric field type, a structure in which a common electrode provided on an active matrix substrate is divided into a plurality of segments and each of the segments functions as an electrode for a touch sensor is known (for example, Japanese Unexamined Patent Application Publication No. 2015-206830).

It is desirable to provide an active matrix substrate in which an area of a transparent auxiliary capacitor can be enlarged while suppressing a leak current between the electrodes in the transparent auxiliary capacitor using a pixel electrode and a common electrode, and a method for manufacturing the same.

SUMMARY

According to an aspect of the disclosure, there is provided an active matrix substrate, a method for manufacturing the active matrix substrate, and an in-cell touch panel display device described in the following items.

Item 1

The active matrix substrate that includes a display region having a plurality of pixel regions, the active matrix substrate includes a substrate; a thin film transistor supported on the substrate, and disposed in association with each of the pixel regions; a pixel electrode disposed above the thin film transistor in each of the pixel regions; a pixel contact portion that electrically connects the pixel electrode to the thin film transistor in each of the pixel regions; and a common electrode disposed above the thin film transistor so as to at least partially overlap the pixel electrode of each of the pixel regions with a dielectric layer therebetween, and electrically separated from the pixel electrode, in which the thin film transistor includes a semiconductor layer, a gate electrode, a gate insulating layer disposed between the semiconductor layer and the gate electrode, a source electrode, and a drain electrode, and the drain electrode is disposed on the semiconductor layer with a lower insulating layer therebetween, and is in contact with a portion of the semiconductor layer in a drain opening portion formed in the lower insulating layer, the pixel contact portion in each of the pixel regions includes the drain electrode, a first insulating layer that covers the drain electrode, a connecting electrode in contact with the drain electrode in a first opening portion formed in the first insulating layer, a second insulating layer that covers the connecting electrode, and the pixel electrode in contact with the connecting electrode in a second opening portion formed in the second insulating layer, a transparent capacitor portion including the pixel electrode, the common electrode, and the dielectric layer located between the pixel electrode and the common electrode is formed on the second insulating layer, and when viewed from a direction normal to the substrate, in each of the pixel regions, a drain contact region where the drain electrode and the semiconductor layer are in contact with each other in the drain opening portion does not overlap either a first contact region where the connecting electrode and the drain electrode are in contact with each other in the first opening portion or a second contact region where the pixel electrode and the connecting electrode are in contact with each other in the second opening portion, the entirety of the second contact region overlaps the first contact region, and the transparent capacitor portion at least partially overlaps the first contact region.

Item 14

The in-cell touch panel display device includes the active matrix substrate according to Item 1.

Item 15

The method for manufacturing an active matrix substrate that includes a plurality of pixel regions, a thin film transistor and a pixel electrode associated with each of the pixel regions, and a pixel contact portion electrically connecting the thin film transistor and the pixel electrode in each of the pixel regions, the method includes (A) forming a semiconductor layer serving as an active layer of the thin film transistor on a substrate in a TFT formation region where the thin film transistor is formed in each of the pixel regions; (B) forming a lower insulating layer that covers the semiconductor layer, and forming a drain opening portion that exposes a portion of the semiconductor layer and a source opening portion that exposes another portion of the semiconductor layer in the lower insulating layer in each of the TFT formation regions; (C) forming a drain electrode in contact with the portion of the semiconductor layer on the lower insulating layer and in the drain opening portion, and forming a source electrode in contact with the other portion of the semiconductor layer on the lower insulating layer and in the source opening portion in each of the TFT formation regions, so that the thin film transistor is obtained; (D) forming a first insulating layer that covers the drain electrode and the source electrode, and forming a first opening portion that exposes a portion of the drain electrode in the first insulating layer in a pixel contact portion formation region where the pixel contact portion is formed in each of the pixel regions; (E) forming a connecting electrode in contact with the portion of the drain electrode in the first opening portion in each of the pixel contact portion formation regions; (F) forming a second insulating layer that covers the connecting electrode and forming a second opening portion that exposes a portion of the connecting electrode in the second insulating layer in each of the pixel contact portion formation regions; and (G) forming the pixel electrode, a common electrode, and a dielectric layer on the second insulating layer in each of the pixel regions, the pixel electrode being disposed so as to be in contact with a portion of the connecting electrode in the second opening portion and to partially overlap the common electrode with the dielectric layer therebetween, in which a drain contact region where the drain electrode and the semiconductor layer are in contact with each other in the drain opening portion does not overlap either a first contact region where the connecting electrode and the drain electrode are in contact with each other in the first opening portion or a second contact region where the pixel electrode and the connecting electrode are in contact with each other in the second opening portion, and the entirety of the second contact region overlaps the first contact region in each of the pixel regions, when viewed from a direction normal to the substrate, and a transparent capacitor portion formed by the pixel electrode, the common electrode, and the dielectric layer located between the pixel electrode and the common electrode at least partially overlaps the first contact region in each of the pixel regions, when viewed from the direction normal to the substrate.

According to one embodiment of the present disclosure, there are provided an active matrix substrate in which an area of a transparent auxiliary capacitor can be enlarged while suppressing a leak current between electrodes in the transparent auxiliary capacitor using a pixel electrode and a common electrode, and a method for manufacturing the same.

BRIEF DESCRIPTION OF THE DRAWINGS

FIG. 1A is a plan view schematically illustrating one pixel region in an active matrix substrate according to a first embodiment;

FIG. 1C is a sectional view taken along line Ic-Ic' illustrated in FIG. 1A in the pixel region of the active matrix substrate;

FIG. 5B is a sectional view taken along line Vb-Vb' illustrated in FIG. 5A in the pixel region of the active matrix substrate;

FIG. 6J is a step sectional view illustrating the method for manufacturing the active matrix substrate;

FIG. 7 is a schematic view of an in-cell touch panel liquid crystal display device 1000 using the active matrix substrate.

DESCRIPTION OF THE EMBODIMENTS

Figure 1B:
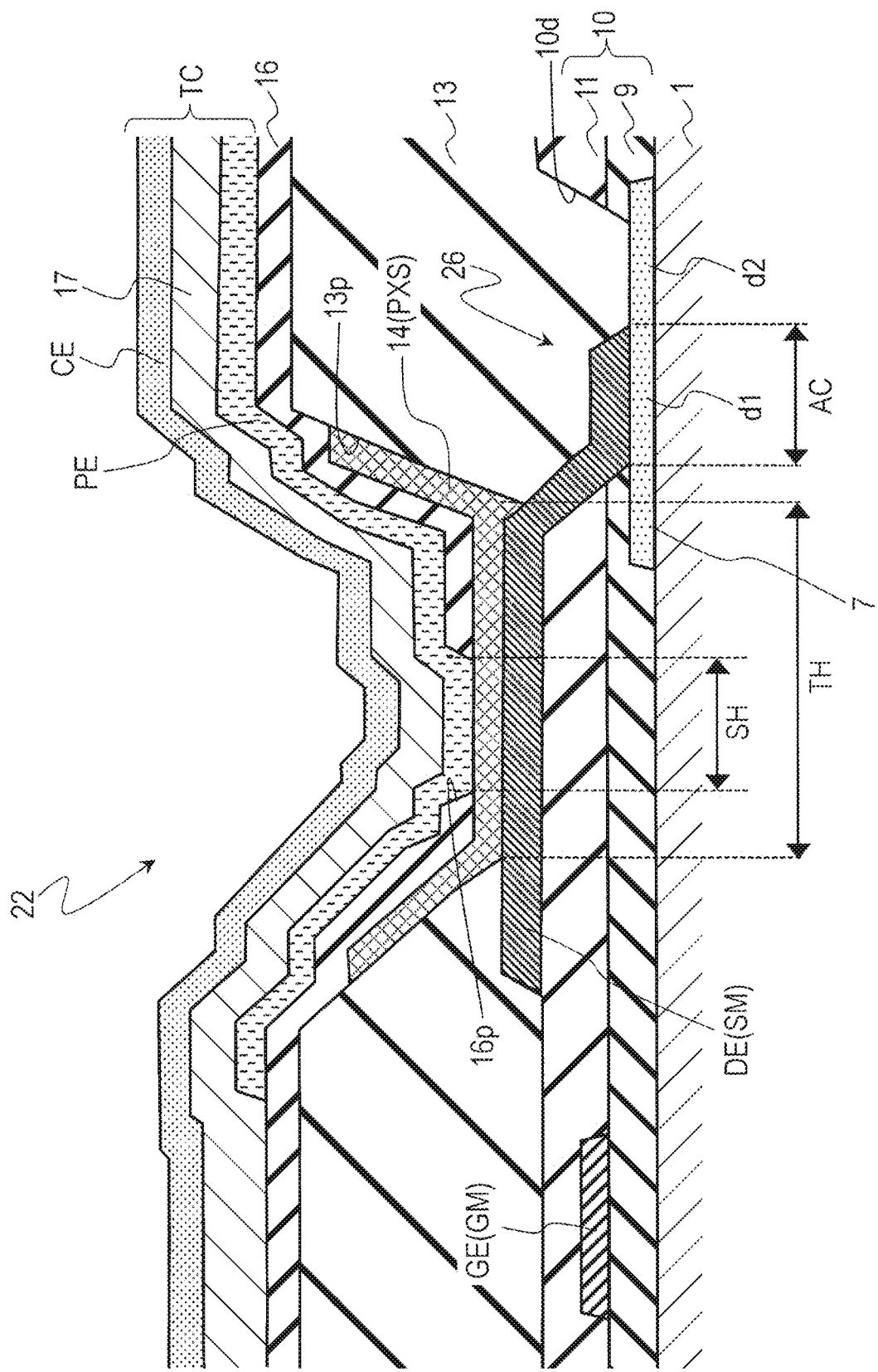
FIG. 1B is a sectional view taken along line Ib-Ib' illustrated in FIG. 1A in the pixel region of the active matrix substrate.

In an active matrix substrate in the related art, when a pixel TFT or a pixel contact portion (contact portion between pixel TFT and pixel electrode) is formed, relatively large unevenness (step difference) may occur in an upper layer. When a transparent auxiliary capacitor formed of a pixel electrode, a common electrode, and a dielectric located between the pixel electrode and the common electrode is formed on a region where such a step difference is formed (hereinafter, "uneven region"), the transparent auxiliary capacitor has an uneven shape that reflects the step difference of the uneven region. Therefore, in the transparent auxiliary capacitor, a leakage may occur between the pixel electrode and the common electrode due to the uneven shape.

In particular, in an in-cell touch panel display device, in a case where the common electrode provided on the active matrix substrate is divided into a plurality of segments and each of the segments functions as an electrode for a touch sensor, when a leakage occurs between a portion of the segments and the pixel electrode, the common potential may vary between the segments in the panel. As a result, a boundary between the segments may be recognized as a defective "display unevenness".

Therefore, in the active matrix substrate in the related art, the transparent auxiliary capacitor is disposed on a relatively flat region in the pixel. For example, International Publication No. 2017/213173 discloses a structure in which an opening portion is provided in a portion of the common electrode located on the pixel contact portion, and the transparent auxiliary capacitor is not formed on the pixel contact portion.

In recent years, as the definition of display panels is increased, the ratio of the area of the pixel TFT, the pixel contact portion, and the like to the entirety of the pixel is increased, and the area ratio of a flat region where a transparent auxiliary capacitor can be formed is decreased. As a result, it may be difficult to ensure a sufficient auxiliary capacitor with the structure in the related art.

Therefore, the inventor of the present application has found a structure in which unevenness due to the pixel contact portion is reduced and the transparent auxiliary capacitor can be disposed on the pixel contact portion in order to ensure the sufficient auxiliary capacitor. According to one embodiment of the present disclosure, since the unevenness formed on the pixel contact portion is reduced, it is possible to form a more flattened transparent auxiliary capacitor that can suppress the occurrence of leakage on the pixel contact portion. The area of the transparent auxiliary capacitor can be increased by extending the transparent auxiliary capacitor even over the pixel contact portion. In the in-cell touch panel display device, by disposing the electrodes for touch sensor also on the pixel contact portion, it is possible to increase the region where the touch can be detected.

First Embodiment

Hereinafter, the active matrix substrate according to the first embodiment will be described with reference to the drawings. Here, an active matrix substrate used in an in-cell touch panel liquid crystal display device that performs display in the FFS mode will be described as an example. The active matrix substrate according to the present embodiment can be applied to an on-cell touch panel display device or a display device having no touch panel function.

FIG. 1A is a plan view schematically illustrating one pixel region in an active matrix substrate 101 according to the first embodiment. FIGS. 1B and 1C are sectional views taken along line Ib-Ib' and line Ic-Ic' illustrated in FIG. 1A in the pixel region of the active matrix substrate 101, respectively.

The active matrix substrate 101 includes a display region including a plurality of pixel regions. The active matrix substrate 101 includes a plurality of gate bus lines GL extending in a first direction and a plurality of source bus lines SL extending in a second direction intersecting the first direction in the display region. Each of the pixel regions is defined by the gate bus line GL and the source bus line SL.

Each of the pixel regions includes a substrate 1, a TFT 20 supported on the substrate 1, a pixel electrode PE, and a pixel contact portion 22 that electrically connects the TFT 20 and the pixel electrode PE. The TFT 20 may be disposed in association with each of the pixel regions, and a portion thereof may be located outside the pixel region.

The TFT 20 includes a semiconductor layer 7, a gate electrode GE, a gate insulating layer 9 disposed between the semiconductor layer 7 and the gate electrode GE, a source electrode SE, and a drain electrode DE. The source electrode SE is electrically connected to the corresponding source bus line SL, and the gate electrode GE is electrically connected to the corresponding gate bus line GL. The drain electrode DE is electrically connected to the corresponding pixel electrode PE in the pixel contact portion 22.

The gate electrode GE may be formed using, for example, the same conductive film (conductive film for gate) as that of the gate bus line GL. A layer GM including an electrode and wiring formed by using the conductive film for gate is referred to as a "gate metal layer". In FIG. 1A, the electrode and wiring in the gate metal layer GM is denoted by "(GM)" after the reference numeral. The gate electrode GE may be connected to (formed integrally with) the gate bus line GL, or may be a portion of the gate bus line GL.

The source electrode SE and the drain electrode DE may be formed using, for example, the same conductive film (conductive film for source) as that of the source bus line SL. A layer SM including the electrode and wiring formed by using the conductive film for source is referred to as a "source metal layer". In FIG. 1A, the electrode and wiring in the source metal layer SM is denoted by "(SM)" after the reference numeral. The source electrode SE may be connected to (formed integrally with) the source bus line SL, or may be a portion of the source bus line SL.

Here, the TFT 20 has a top-gate structure, and the gate electrode GE is disposed on a portion of the semiconductor layer 7 with the gate insulating layer 9 therebetween. The semiconductor layer 7 and the gate electrode GE are covered with an interlayer insulating layer 11. The source electrode SE and the drain electrode DE are disposed on the interlayer insulating layer 11. The structure of the TFT 20 is not limited thereto, and may be a bottom-gate structure.

When viewed from the direction normal to the substrate 1, the semiconductor layer 7 includes a channel region overlapping the gate electrode GE, and a source region and a drain region disposed on both sides of the channel region, respectively. The source region and the drain region are low resistance regions having a smaller specific resistivity than that of the channel region.

In the illustrated example, the semiconductor layer 7 extends across the gate bus line GL twice, and two portions of the semiconductor layer 7 overlapping the gate bus line GL each serve as a channel region (multi-gate structure). The source region and the drain region are formed on both sides of the two channel regions of the semiconductor layer 7, respectively. A low resistance region is also formed in the portion located between the two channel regions. For example, the semiconductor layer 7 is a crystalline silicon layer such as a polycrystalline silicon layer, and the low resistance regions such as the source region and the drain region may be a high-concentration impurity region containing impurities (for example, n-type impurities) at a higher concentration than that of the channel region. The TFT 20 may have a single-gate structure.

The source electrode SE and the drain electrode DE are disposed on the semiconductor layer 7 with the lower insulating layer 10 including the interlayer insulating layer 11 therebetween. In this example, the lower insulating layer 10 includes the interlayer insulating layer 11 and the gate insulating layer 9. The lower insulating layer 10 is formed with a source opening portion 10s exposing a portion of the source region of the semiconductor layer 7 and a drain opening portion 10d exposing a portion of the drain region of the semiconductor layer 7.

The source electrode SE is disposed on the interlayer insulating layer 11 and in the source opening portion 10s, and is in contact with the source region of the semiconductor layer 7 in the source opening portion 10s. The drain electrode DE is disposed on the interlayer insulating layer 11 and in the drain opening portion 10d, and is in contact with the drain region of the semiconductor layer 7 in the drain opening portion 10d. In this specification, a portion 24 that electrically connects the source electrode SE and the semiconductor layer 7 of each of the TFTs 20 is referred to as a "source contact portion", and a portion 26 that electrically connects the drain electrode DE and the semiconductor layer 7 of each of the TFTs 20 is referred to as a "drain contact portion 26". A region AC where the drain electrode DE and the semiconductor layer 7 are in contact with each other in the drain opening portion 10d is referred to as a "drain contact region".

The TFT 20 and the source metal layer SM are covered with the first insulating layer 13. For example, the first insulating layer 13 may have a multilayer structure including an inorganic insulating layer (passivation film) and an organic insulating layer formed on the inorganic insulating layer. At least one of the inorganic insulating film and the organic insulating film may be formed as the first insulating layer 13. For example, the organic insulating layer may not be formed. Alternatively, the organic insulating layer may be formed inly in the display region.

A plurality of pixel electrodes PE are disposed on the first insulating layer 13. In the pixel contact portion 22, each of the pixel electrodes PE is electrically connected to the drain electrode DE of the corresponding TFT 20 via the connecting electrode 14.

The pixel contact portion 22 includes the drain electrode DE, the connecting electrode 14 disposed in the first opening portion 13p formed in the first insulating layer 13 and in contact with the drain electrode DE in the first opening portion 13p, the second insulating layer 16 covering the connecting electrode 14, and the pixel electrode PE disposed on the second insulating layer 16 and in the second opening portion 16p formed in the second insulating layer 16 and in contact with the connecting electrode 14 in the second opening portion 16p. The connecting electrode 14 may be formed in an island shape in each of the pixel regions. As illustrated in the drawing, the connecting electrode 14 may be disposed only in the first opening portion 13p and may not be located on the upper surface of the first insulating layer 13. In the present specification, a region TH where the connecting electrode 14 and the drain electrode DE are in contact with each other in the first opening portion 13p is referred to as a "first contact region", and a region SH where the pixel electrode PE and the connecting electrode 14 are in contact with each other in the second opening portion 16p is referred to as a "second contact region".

A common electrode CE to which a common signal is applied is provided on the plurality of pixel electrodes PE. The common electrode CE is disposed on the pixel electrode PE with the dielectric layer 17 therebetween and is electrically separated from the pixel electrode PE. Although not illustrated, in each of the pixel regions, one or a plurality of slits or notched portions are provided in the common electrode CE. The common electrode CE may not be separated for each pixel region. For example, the portions of the common electrode CE located in the respective pixel regions may be connected to each other.

In each of the pixel regions, the pixel electrode PE is disposed so as to at least partially overlap the common electrode CE with the dielectric layer 17 therebetween, so that a transparent capacitor portion TC including the pixel electrode PE, the common electrode CE, and a dielectric (dielectric layer 17) located between the pixel electrode and the common electrode is formed. In this example, the pixel electrode PE, the dielectric layer 17, and the common electrode CE are formed in this order from the substrate 1 side.

As will be described later, the common electrode CE, the dielectric layer 17, and the pixel electrode PE may be formed in this order from the substrate 1 side. In this case, in each of the pixel regions, one or a plurality of slits or notched portions are provided in the pixel electrode PE.

In a case where the active matrix substrate 101 is applied to a display device having a touch sensor function, the common electrode CE is divided into a plurality of segments, and each of the segments may function as an electrode for a touch sensor (referred to as "touch sensor electrode"). The touch sensor electrode may be a detection electrode or a drive electrode in a capacitive touch sensor. Each of the touch sensor electrodes is electrically connected to the corresponding touch wire TL in the touch wire contact portion 28. Each of the touch sensor electrodes may be in contact with the corresponding touch wire TL in a touch wire opening portion 17q formed in the second insulating layer 16 and the dielectric layer 17. The touch wires TL may be disposed on all or a portion of the source bus lines SL of the plurality of source bus lines SL, and may extend so as to overlap the source bus lines SL when viewed from the direction normal to the substrate 1.

The touch wire TL may be formed using the same conductive film as that of the connecting electrode 14 (conductive film for connecting electrode). The touch wire TL and the connecting electrode 14 are disposed with an interval therebetween and are electrically separated. The layer PXS including the electrode and wiring formed by using the conductive film for connecting electrode is referred to as a "connecting metal layer". In this example, the connecting metal layer PXS is formed between the first insulating layer 13 and the second insulating layer 16. In FIG. 1A, the electrode and wiring in the connecting metal layer PXS is denoted by "(PXS)" after the reference numeral. Arrangement of Contact Regions AC, TH, SH and Transparent capacitor portion TC In the active matrix substrate 101, the drain contact portion 26 is disposed so as not to overlap the pixel contact portion 22. That is, when viewed from the direction normal to the substrate 1, the drain contact region AC does not overlap either the first contact region TH or the second contact region SH in the pixel contact portion 22. In the pixel contact portion 22, the entirety of the second contact region SH overlaps the first contact region TH.

As illustrated in the drawing, when viewed from the direction normal to the substrate 1, both a bottom surface of the first opening portion 13p and a bottom surface of the second opening portion 16p may be disposed so as not to overlap a bottom surface of the drain opening portion 10d. The entirety of the bottom surface of the second opening portion 16p may be disposed so as to overlap the bottom surface of the first opening portion 13p.

The transparent capacitor portion TC including the pixel electrode PE, the common electrode CE, and the dielectric layer 17 at least partially overlaps the first contact region TH in the pixel contact portion 22 when viewed from the direction normal to the substrate 1. In this example, the transparent capacitor portion TC overlaps the entirety of the first contact region TH and the entirety of the second contact region SH when viewed from the direction normal to the substrate 1. The transparent capacitor portion TC may also overlap the entirety of the drain contact region AC in the drain contact portion 26.

In the present embodiment, since the first contact region TH and the second contact region SH of the pixel contact portion 22 and the drain contact region AC of the drain contact portion 26 are disposed so as not to overlap each other, the unevenness (step difference) generated by these contact portions can be reduced. As a result, it is possible to dispose the flattened transparent capacitor portion TC on these contact portions, and to suppress the occurrence of leakage between the pixel electrode PE and the common electrode CE in the transparent capacitor portion TC. Therefore, it is possible to reduce display unevenness due to leakage in the transparent capacitor portion TC while enlarging the area of the transparent capacitor portion TC.

Furthermore, in the present embodiment, the connecting electrode 14 serving as a relay layer of the pixel contact portion 22 is formed using the same conductive film as that of the touch wire TL configuring the touch sensor. As a result, it is possible to increase the area of the transparent capacitor portion TC while suppressing the number of manufacturing steps and manufacturing cost.

The pixel contact portion 22 may be disposed between the drain contact portion 26 and the gate bus line GL when viewed from the direction normal to the substrate 1. That is, the first contact region TH and the second contact region SH in the pixel contact portion 22 may be disposed between the gate bus line GL and the drain contact region AC when viewed from the direction normal to the substrate 1. In this case, the drain electrode DE may cover the entirety of the first opening portion 13p and the entirety of the second opening portion 16p in the pixel contact portion 22 and only a portion of the drain opening portion 10d in the drain contact portion 26. By disposing the drain electrode DE in this manner, the width of the drain electrode DE along the second direction (direction where the source bus line SL extends) can be reduced, so that the reduction in a pixel aperture ratio due to the drain electrode DE can be suppressed.

For example, as illustrated in FIG. 1A, the drain contact portion 26 may be disposed near the end portion of the semiconductor layer 7 extending across the gate bus line GL, and the pixel contact portion 22 may be disposed adjacent to a portion of the semiconductor layer 7 located between the gate bus line GL and the drain contact portion 26. As described above, when viewed from the direction normal to the substrate 1, the overlapping portion between the drain electrode DE and the semiconductor layer 7 may be reduced, and a portion of the pixel contact portion 22 (for example, second contact region SH) may be disposed so as not to overlap the semiconductor layer 7. As a result, for example, the drain electrode DE can be disposed substantially in the center between the source bus lines SL, and the semiconductor layer 7 can be disposed so as not to protrude into the pixel opening portion as much as possible. As will be described later, the pixel contact portion 22 may entirely overlap the semiconductor layer 7.

In this example, the drain electrode DE is in contact with only a portion of the region exposed in the drain opening portion 10d of the semiconductor layer 7. In the exposed region of the semiconductor layer 7, a first portion d1 in contact with the drain electrode DE is located closer to the gate bus line GL side (here, pixel contact portion 22 side) than a second portion d2 not in contact with the drain electrode DE. The second portion d2 of the semiconductor layer 7 is in contact with the first insulating layer 13. As a result, the area of the drain electrode DE can be reduced while ensuring the contact area between the drain electrode DE and the semiconductor layer 7, so that the pixel aperture ratio can be improved.

In the active matrix substrate in the related art, the size of the drain electrode may be reduced by disposing the drain contact portion and the pixel contact portion so as to overlap each other when viewed from the direction normal to the substrate 1. In this case, a relatively large step difference (recessed portion) is formed on the contact portions by overlapping the opening portions of the drain contact portion and the pixel contact portion. On the other hand, in the example illustrated in FIG. 1A, since the pixel contact portion 22 and the drain contact portion 26 are disposed so as not to overlap each other, it is possible to reduce the step difference formed on each of the contact portions 22 and 26. As described above, by disposing the drain electrode DE so as to cover only a portion of the drain opening portion 10d of the drain contact portion 26, the area of the drain electrode DE can be reduced and the reduction of the pixel opening portion can be suppressed.

Figure 2A:
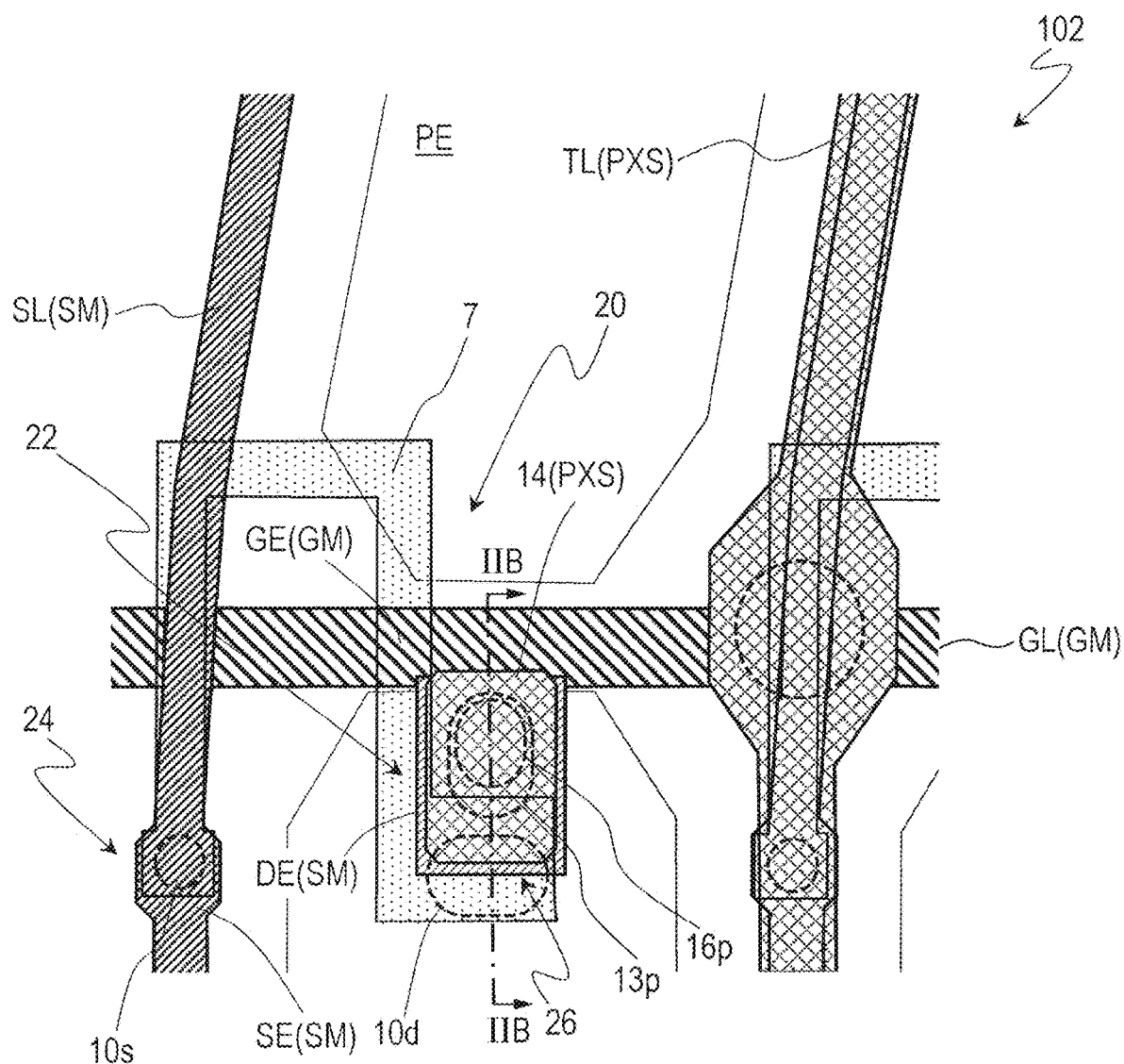
FIG. 2A is a plan view schematically illustrating one pixel region in an active matrix substrate according to the first embodiment.
Figure 2B:
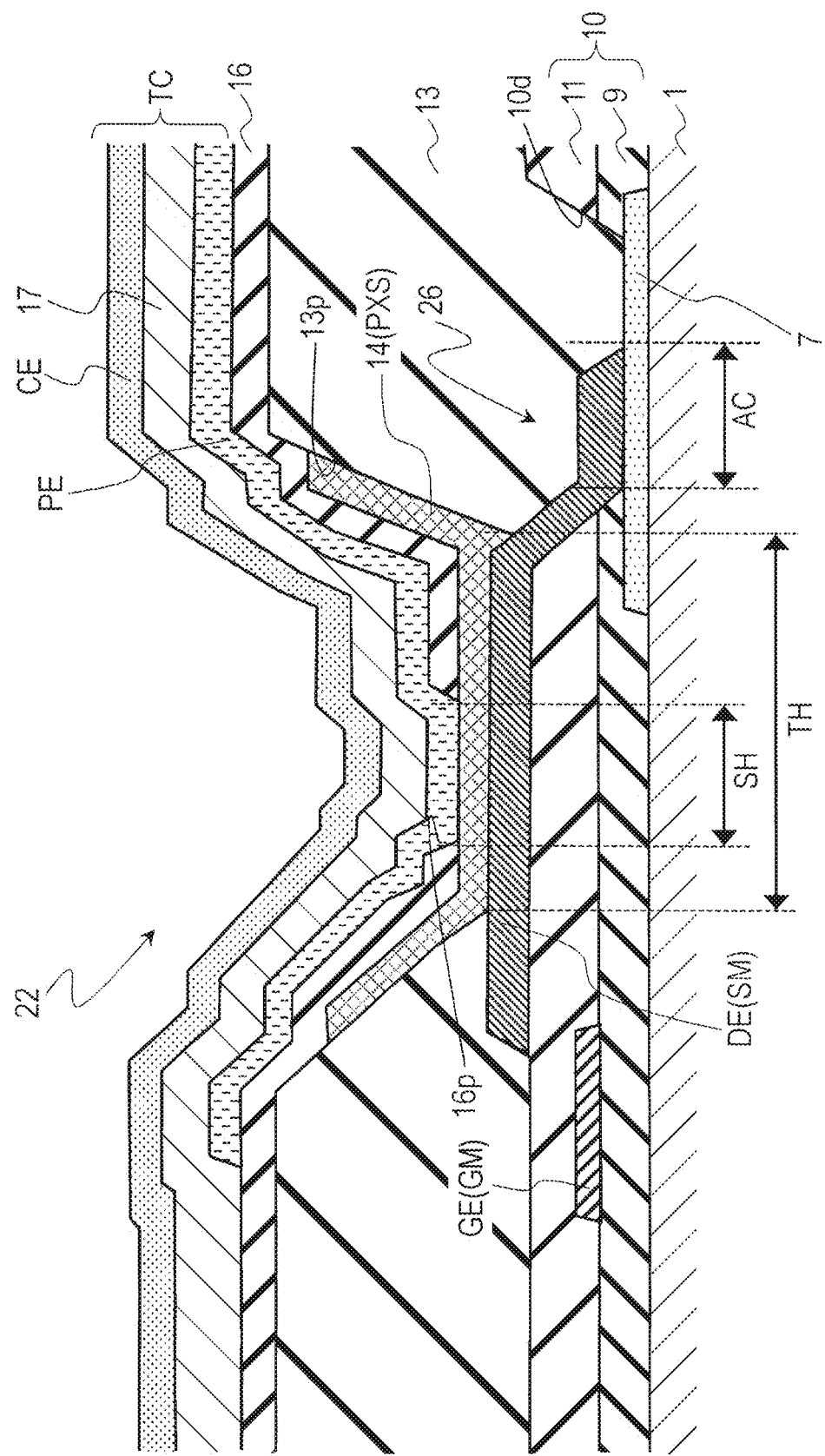
FIG. 2B is a sectional view taken along line IIb-IIb' illustrated in FIG. 2A in the pixel region of the active matrix substrate.

As illustrated in FIGS. 2A and 2B, a portion of the drain electrode DE (end portion) may be disposed so as to overlap the gate bus line GL when viewed from the direction normal to the substrate 1. As a result, it is possible to further suppress the reduction in the pixel aperture ratio due to the drain electrode DE.

In the pixel contact portion 22 according to the present embodiment, the entirety of the bottom surface of the first opening portion 13p in the first insulating layer 13 may overlap the upper surface of the drain electrode DE when viewed from the direction normal to the substrate 1. The entirety of the bottom surface of the second opening portion 16p in the second insulating layer 16 may overlap the upper surface of the connecting electrode 14 when viewed from the direction normal to the substrate 1. As a result, the unevenness due to the pixel contact portion 22 can be reduced more effectively. The reason will be described below with reference to the drawings.

Figure 3A:
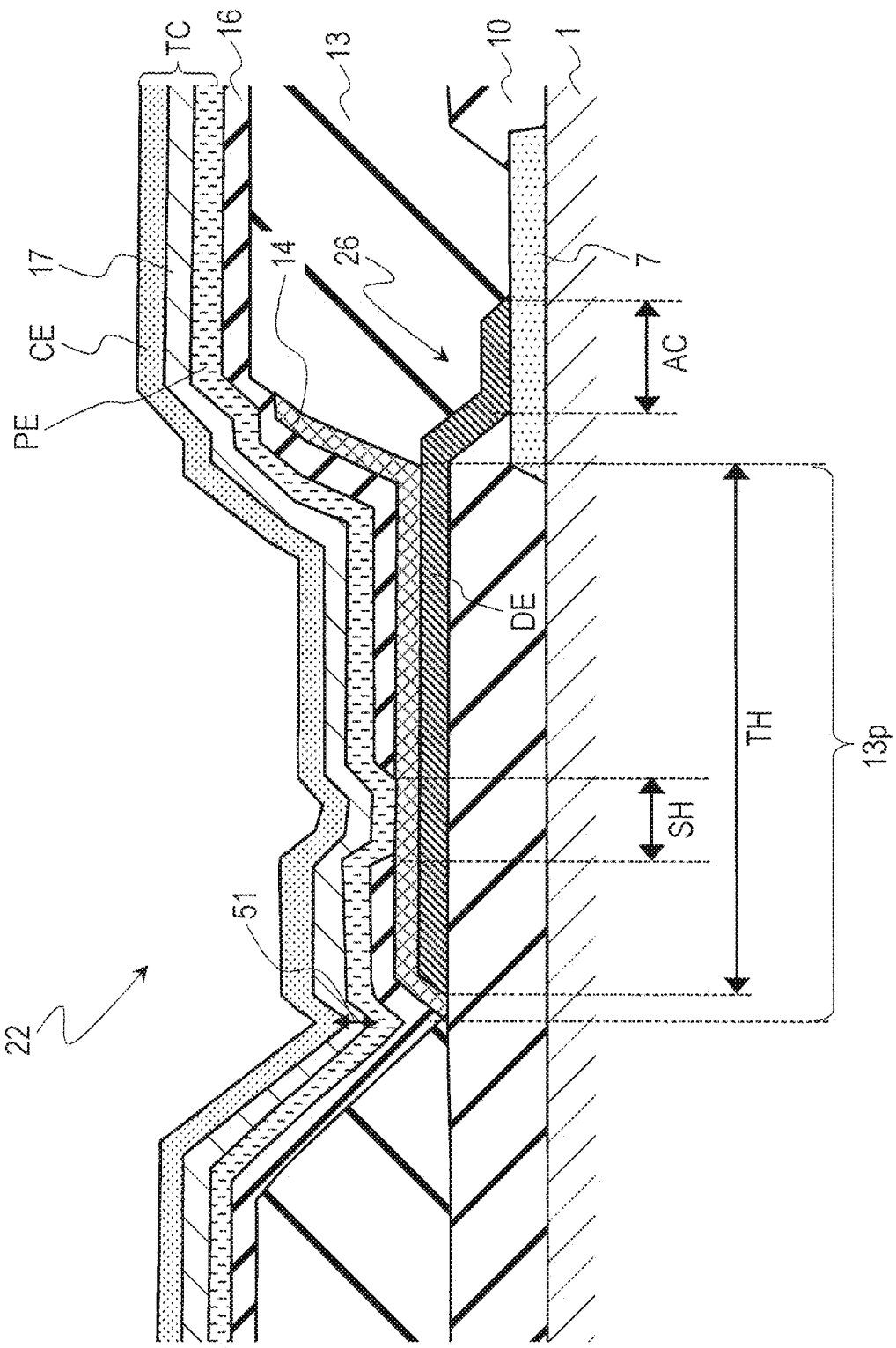
FIG. 3A is a sectional view illustrating another pixel contact portion.

FIG. 3A is a sectional view illustrating another pixel contact portion 22 according to the present embodiment. In the example illustrated in FIG. 3A, the bottom surface of the first opening portion 13p in the first insulating layer 13 overlaps not only the upper surface of the drain electrode DE, but also the side surface (tapered portion) of the drain electrode DE and a portion of the lower insulating layer 10 not covered with the drain electrode DE, when viewed from the direction normal to the substrate 1. Therefore, a step difference may occur in the connecting electrode 14 corresponding to the thickness of the drain electrode DE. This step difference or the tapered shape of the drain electrode DE may be reflected in the upper layer, and a step difference 51 may occur in the transparent capacitor portion TC, which may easily cause a leakage between the pixel electrode and the common electrode of the transparent capacitor portion.

On the other hand, in the pixel contact portion 22 illustrated in FIG. 1B, the entirety of the bottom surface of the first opening portion 13p in the first insulating layer 13 overlaps the upper surface of the drain electrode DE when viewed from the direction normal to the substrate 1. That is, only the upper surface of the drain electrode DE is exposed by the first opening portion 13p, and neither the side surface (tapered portion) of the drain electrode DE nor the upper surface of the lower insulating layer 10 is exposed. In this configuration, since the step difference due to the thickness of the drain electrode DE does not occur in the connecting electrode 14 and the transparent capacitor portion TC, the unevenness formed on the pixel contact portion 22 can be reduced more effectively.

Figure 3B:
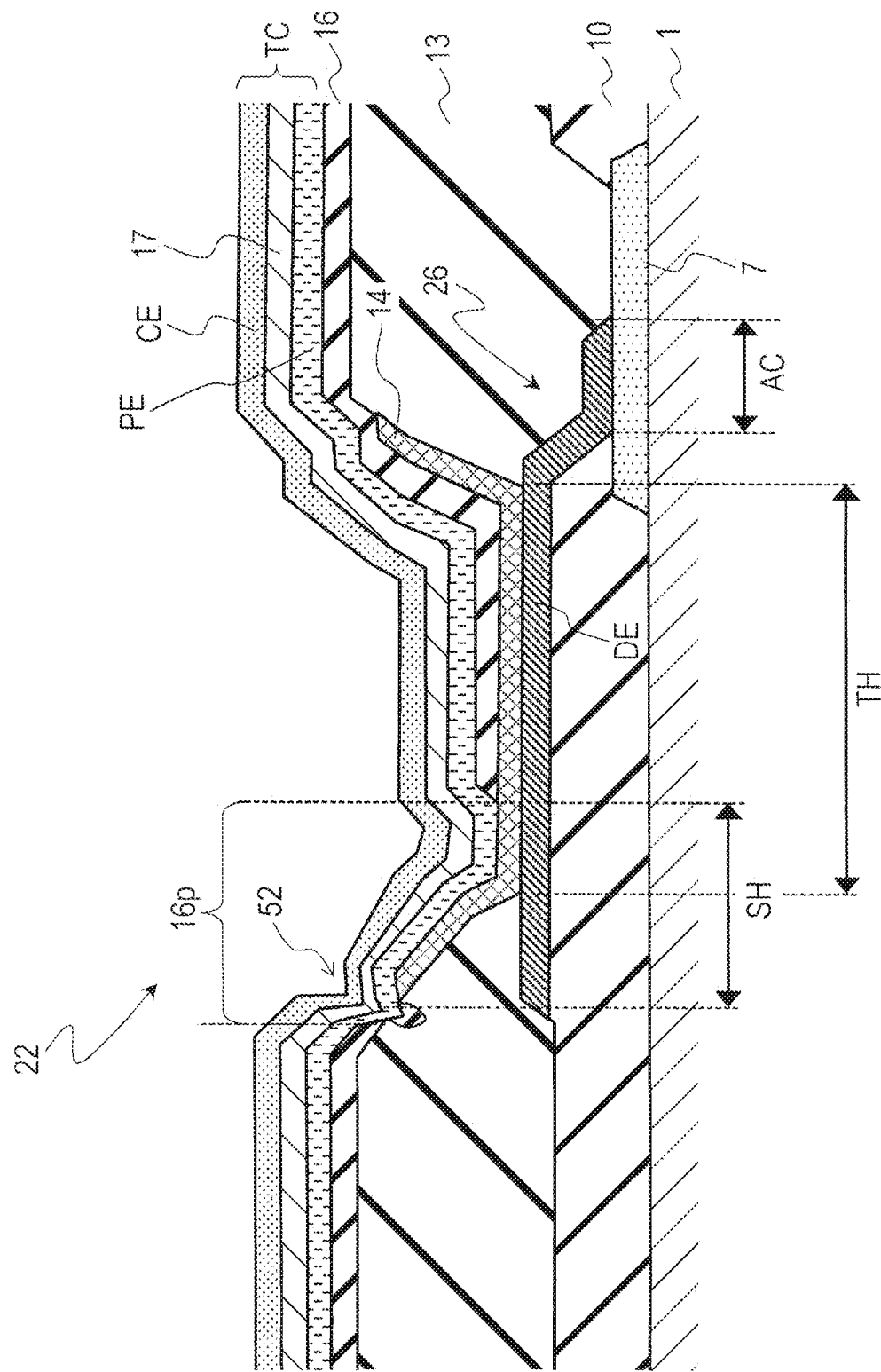
FIG. 3B is a sectional view illustrating still another pixel contact portion.

FIG. 3B is a sectional view illustrating still another pixel contact portion 22 according to the present embodiment. In the example illustrated in FIG. 3B, when viewed from the direction normal to the substrate 1, the bottom surface of the second opening portion 16p in the second insulating layer 16 overlaps not only the upper surface of the connecting electrode 14 but also the side surface (tapered portion) of the connecting electrode 14 and a portion of the first insulating layer 13 not covered with the connecting electrode 14. Therefore, the transparent capacitor portion TC may have a step difference 52 corresponding to the thickness of the connecting electrode 14 or the recessed portion formed in the first insulating layer 13 due to over-etching. A leakage may easily occur between the pixel electrode PE and the common electrode CE of the transparent capacitor portion TC on this step difference 52.

On the other hand, in the pixel contact portion 22 illustrated in FIG. 1B, when viewed from the direction normal to the substrate 1, the entirety of the bottom surface of the second opening portion 16p in the second insulating layer 16 overlaps the upper surface of the connecting electrode 14. That is, only the upper surface of the connecting electrode 14 is exposed by the second opening portion 16p, and neither the side surface (tapered portion) of the connecting electrode 14 nor the first insulating layer 13 is exposed. With this configuration, the pixel electrode PE does not have a step difference due to the thickness of the connecting electrode 14 and the recessed portion of the first insulating layer 13, so that the unevenness formed on the pixel contact portion 22 can be reduced more effectively.

In the present embodiment, the first contact region TH and/or the second contact region SH does not have to overlap the drain contact region AC (bottom surface of the drain opening portion 10d), and may partially overlap the side surface (tapered portion) of the drain opening portion 10d when viewed from the direction normal to the substrate 1. However, when the first contact region TH (bottom surface of the first opening portion 13p) and the second contact region SH (bottom surface of the second opening portion 16p) are disposed so as not to overlap either the side surface or the bottom surface of the drain opening portion 10d, the unevenness on the pixel contact portion 22 can be reduced more reliably. Hereinafter, description will be given with reference to the drawings.

Figure 3C:
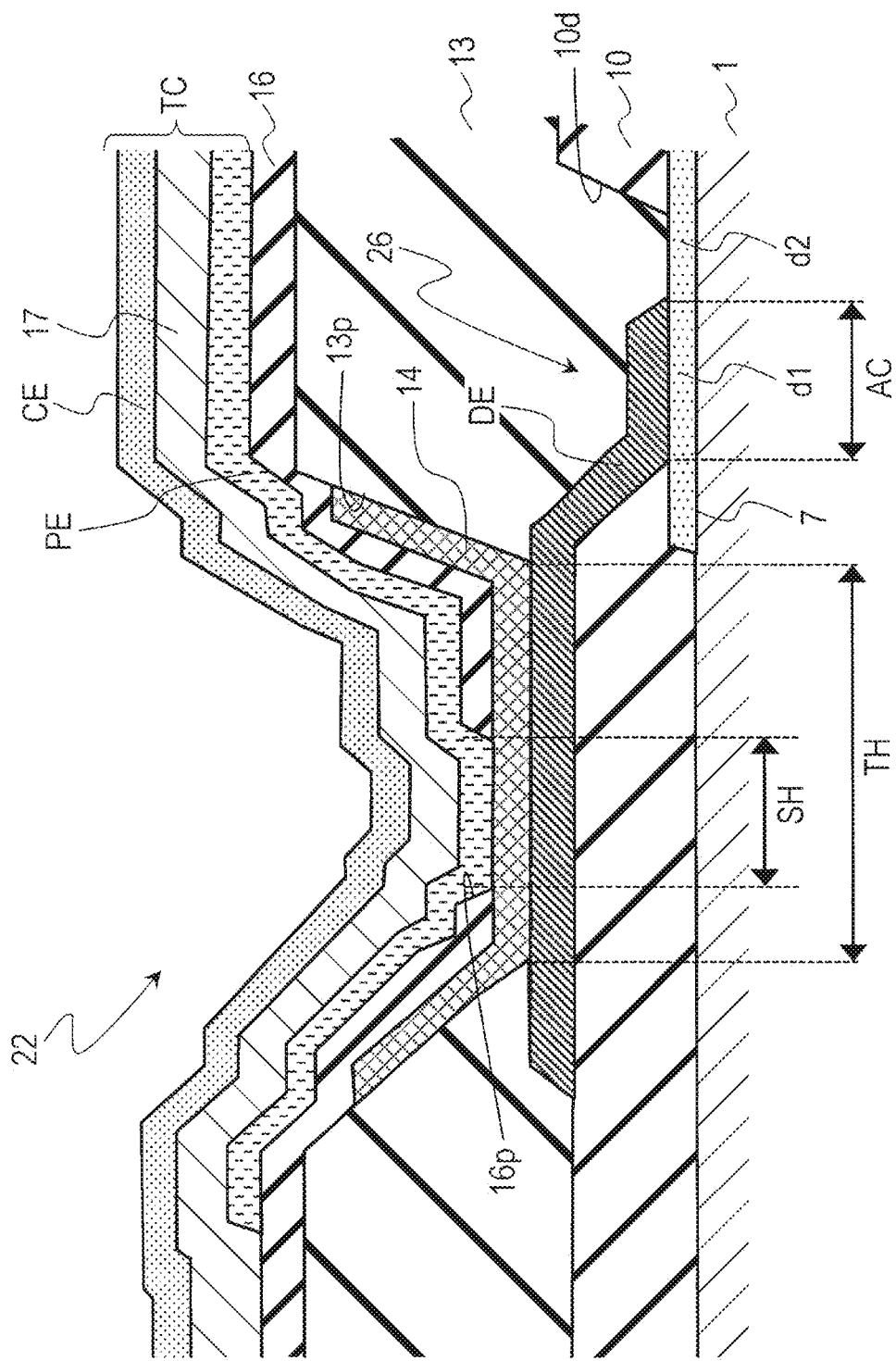
FIG. 3C is a sectional view illustrating still another pixel contact portion.
Figure 8:
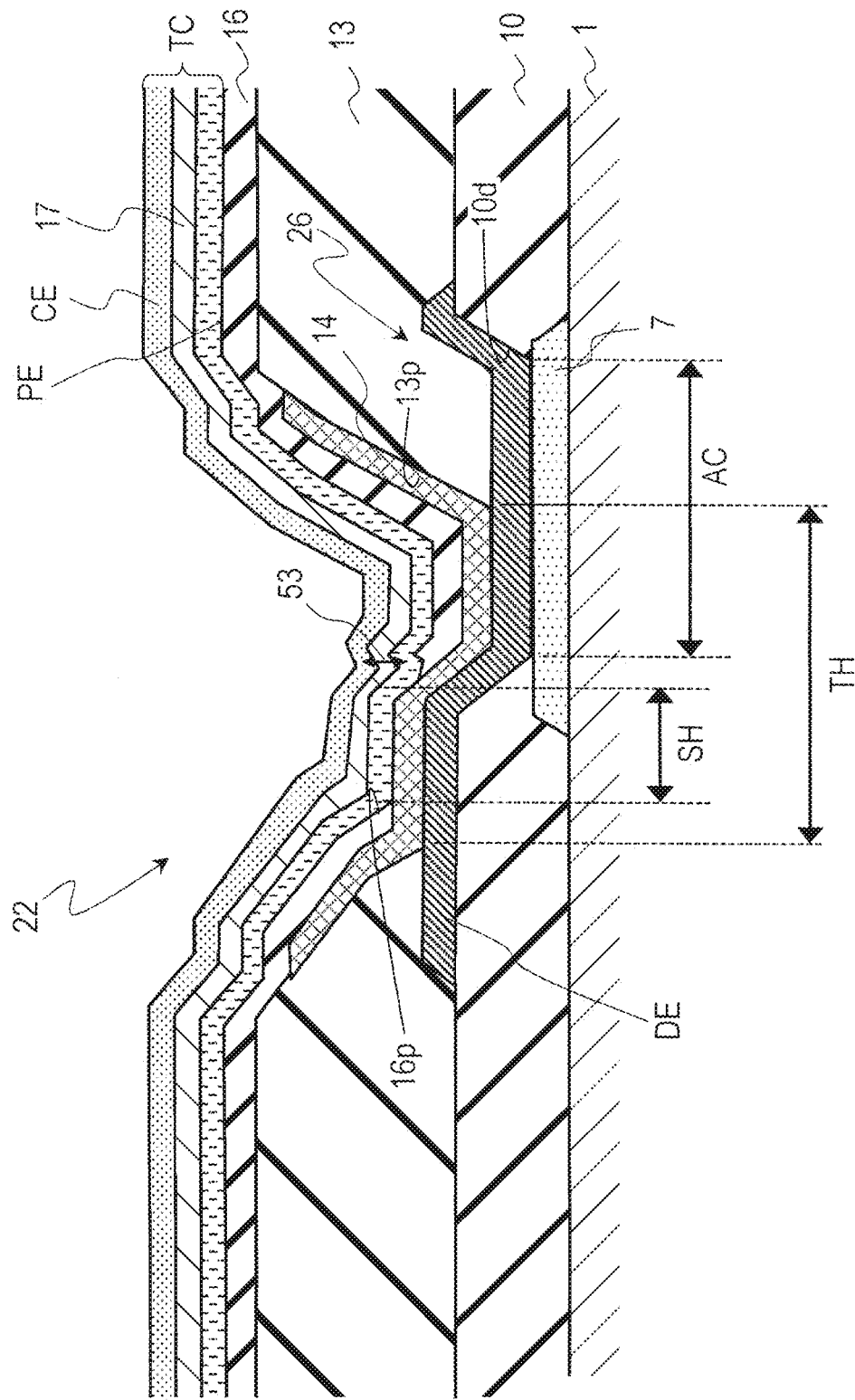
FIG. 8 is a sectional view illustrating a pixel contact portion of a comparative example.

FIG. 3C is a sectional view illustrating another pixel contact portion 22 according to the present embodiment, and FIG. 8 is a sectional view illustrating a pixel contact portion 22 of a comparative example.

In the comparative example illustrated in FIG. 8, the first contact region TH (bottom surface of the first opening portion 13p) overlaps the bottom surface and the side surface of the drain opening portion 10d when viewed from the direction normal to the substrate 1. Therefore, the connecting electrode 14 has a step difference corresponding to the depth of the drain opening portion 10d formed in the lower insulating layer 10. The second contact region SH (bottom surface of the second opening portion 16p) overlaps the side surface of the drain opening portion 10d, and a step difference 53 may be formed in the transparent capacitor portion TC corresponding to the depth of the overlapping portion.

On the other hand, in the example illustrated in FIG. 3C, when viewed from the direction normal to the substrate 1, either the bottom surface of the first opening portion 13p or the bottom surface of the second opening portion 16p are disposed so as not overlap either the side surface or the bottom surface of the drain opening portion 10d. As a result, it is possible to more effectively suppress the occurrence of unevenness due to the drain opening portion 10d on the pixel contact portion 22.

Modification Example 1

In the active matrix substrates 101 and 102, the pixel electrode PE is disposed closer to the substrate 1 side than the common electrode CE, and the common electrode CE may be disposed closer to the substrate 1 side than the pixel electrode PE.

Figure 4A:
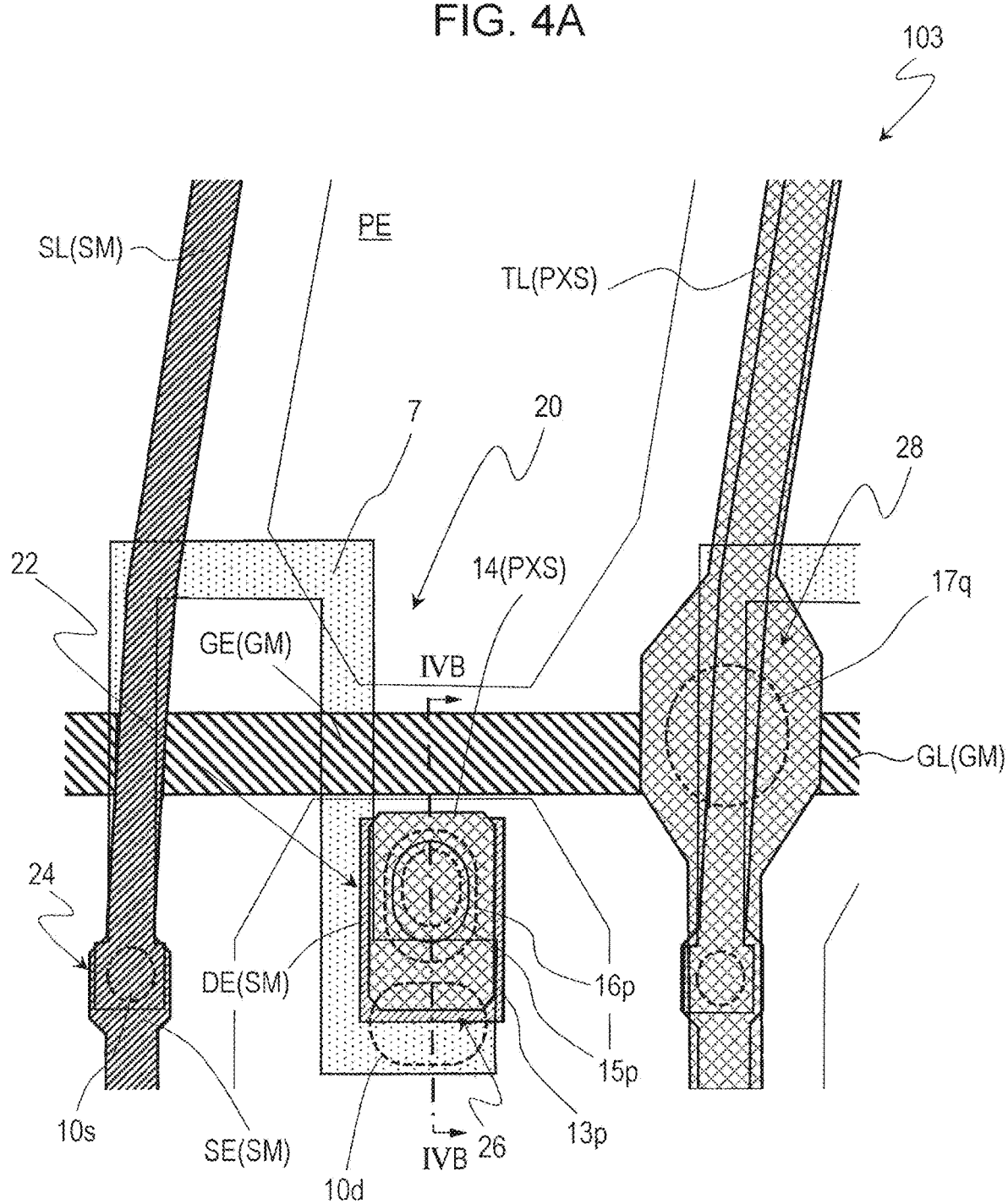
FIG. 4A is a plan view illustrating a portion of a pixel region of an active matrix substrate according to Modification Example 1.
Figure 4B:
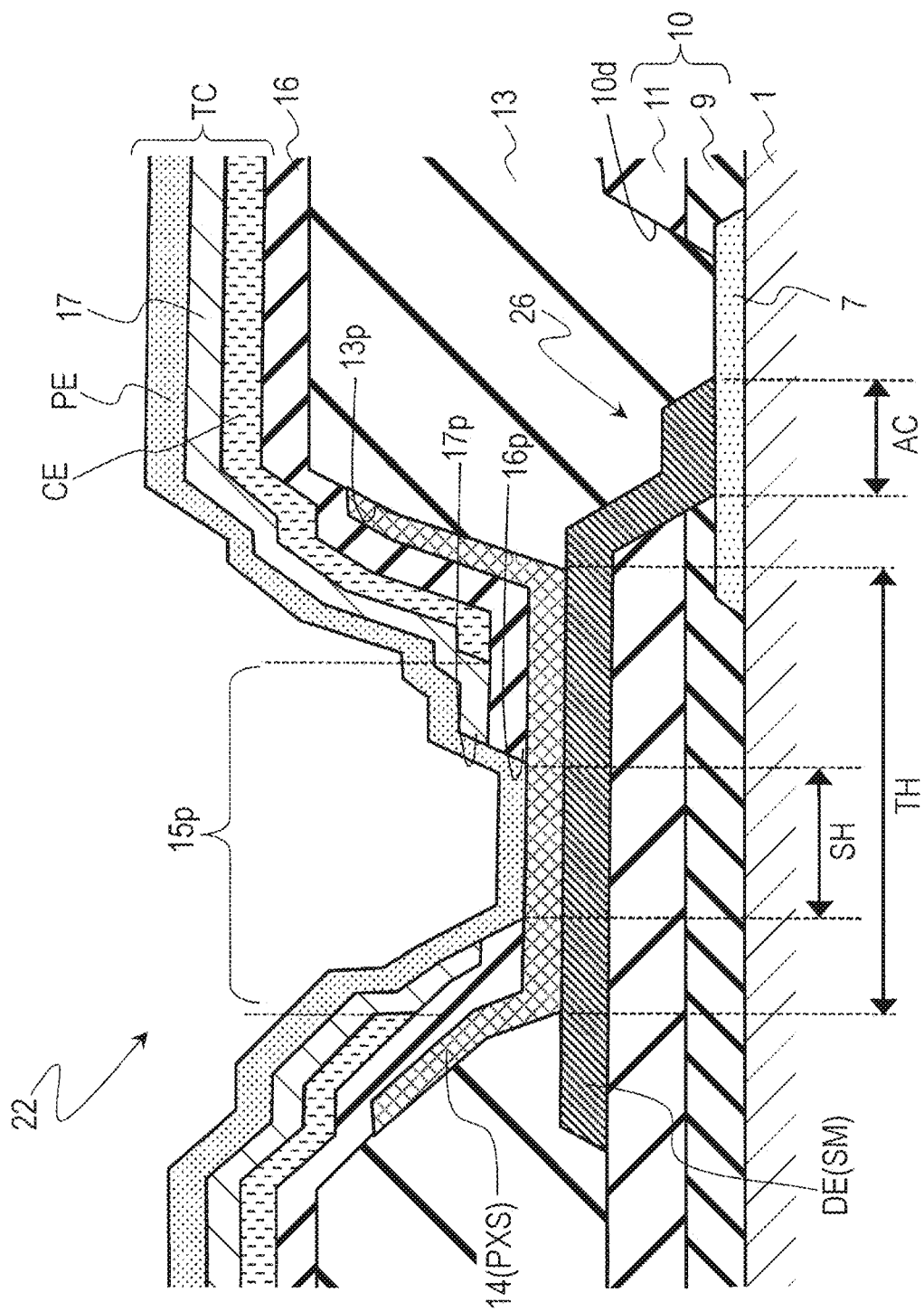
FIG. 4B is a sectional view taken along line IVb-IVb' illustrated in FIG. 4A in the pixel region of the active matrix substrate.

FIG. 4A is a plan view illustrating a portion of a pixel region of an active matrix substrate 103 according to Modification Example 1, and FIG. 4B is a sectional view taken along line IVb-IVb' illustrated in FIG. 4A in the pixel region of the active matrix substrate 103.

The active matrix substrate 103 is different from the active matrix substrate 101 in that the common electrode CE is disposed closer to the substrate 1 than the pixel electrode PE. Hereinafter, points different from the active matrix substrate 101 will be described, and description of similar configurations will be omitted.

In the active matrix substrate 103, similarly to the active matrix substrate 101, the semiconductor layer 7, the lower insulating layer 10, the source metal layer SM including the source electrode SE and the drain electrode DE, the first insulating layer 13, and the connecting metal layer PXS including the connecting electrode 14 and the touch wire TL are formed in this order on the substrate 1.

The transparent capacitor portion TC including the common electrode CE, the dielectric layer 17, and the pixel electrode PE in this order is provided on the second insulating layer 16. In the present modification example, the common electrode CE includes an opening portion 15p on a portion of the pixel contact portion 22.

In the pixel contact portion 22, the pixel electrode PE is disposed on the dielectric layer 17, in the third opening portion 17p formed in the dielectric layer 17, and in the second opening portion 16p formed in the second insulating layer 16, and is in contact with the connecting electrode 14 in the second opening portion 16p (second contact region SH). When viewed from the direction normal to the substrate 1, the second opening portion 16p and the third opening portion 17p are located inside the opening portion 15p of the common electrode CE. That is, the second contact region SH is located inside the opening portion 15p. The second opening portion 16p and the third opening portion 17p may be formed by etching using the same mask, and in this case, the side surface of the second opening portion 16p and the side surface of the third opening portion 17p are aligned with each other.

In the present modification example, the opening portion 15p of the common electrode CE is disposed so as to overlap the entirety of the second contact region SH and partially overlap the first contact region TH when viewed from the direction normal to the substrate 1. The transparent capacitor portion TC including the common electrode CE, the pixel electrode PE, and the second insulating layer 16 is extended on a portion of the first contact region TH which does not overlap the opening portion 15p.

Also in the present modification example, when viewed from the direction normal to the substrate 1, the drain contact region AC does not overlap the first contact region TH and the second contact region SH, and the entirety of the second contact region SH overlaps the first contact region TH. Since the unevenness on the pixel contact portion 22 is reduced by such an arrangement, even when the transparent capacitor portion TC is also disposed on a portion of the first contact region TH, it is possible to suppress the occurrence of leakage in the transparent capacitor portion TC. Therefore, by extending the transparent capacitor portion TC on a portion of the first contact region TH, it is possible to enlarge the area of the transparent capacitor portion TC while suppressing leakage in the transparent capacitor portion TC.

Modification Example 2

Figure 5A:
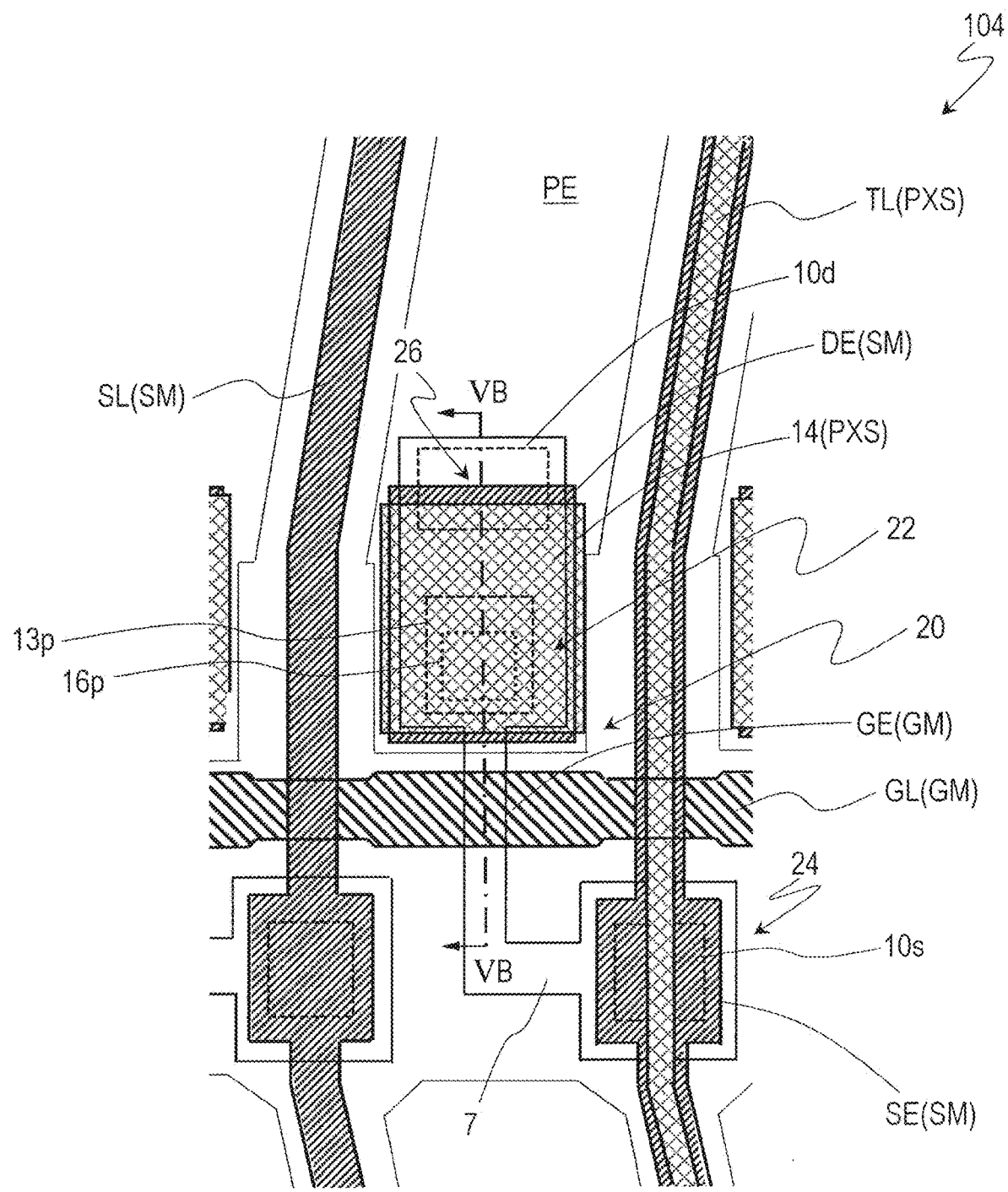
FIG. 5A is a plan view illustrating a portion of a pixel region of an active matrix substrate according to Modification Example 2.

FIG. 5A is a plan view illustrating a portion of a pixel region of the active matrix substrate 104 according to the modification example, and FIG. 5B is a sectional view taken along line Vb-Vb' illustrated in FIG. 5A in the pixel region of the active matrix substrate 104.

As illustrated in the drawing, the entirety of the first contact region TH and the entirety of the second contact region SH in the pixel contact portion 22 may be disposed so as to overlap the semiconductor layer 7 when viewed from the direction normal to the substrate 1.

In the present modification example, when viewed from the direction normal to the substrate 1, the first contact region TH and the second contact region SH may be located between the channel region 7c of the semiconductor layer 7 and the drain contact region AC in the channel length direction of the TFT 20. In this case, the drain electrode DE may cover only a portion of the drain opening portion 10d. As a result, it is possible to suppress the reduction in the pixel aperture ratio due to the drain electrode DE, while reducing the unevenness generated in the transparent capacitor portion TC.

Although the TFT 20 has a single-gate structure in this example, the TFT 20 may have a multi-gate structure.

Method for Manufacturing Active Matrix Substrate

Hereinafter, a method for manufacturing the active matrix substrate according to the present embodiment will be described with reference to the drawings.

FIGS. 6A to 6J are step sectional views for describing the method for manufacturing the active matrix substrate 101. Here, a region where a TFT is formed in each of the pixel regions (TFT formation region) is illustrated.

Figure 6A:
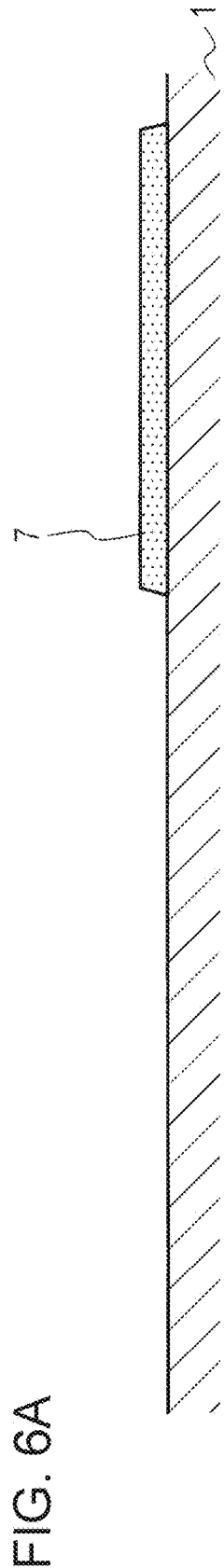
FIG. 6A is a step sectional view illustrating a method for manufacturing the active matrix substrate.

First, as illustrated in FIG. 6A, a crystalline semiconductor film is formed on the substrate 1, and the crystalline semiconductor film is patterned to form a semiconductor layer 7. A base insulating film may be formed between the substrate 1 and the semiconductor layer 7.

As the substrate 1, a transparent substrate having insulation such as a glass substrate, a silicon substrate, or a plastic substrate having heat resistance (resin substrate) can be used.

The crystalline semiconductor film can be formed by crystallizing an amorphous semiconductor film (thickness: 20 nm or more and 100 nm or less) formed on the substrate 1. As the amorphous semiconductor film, for example, a silicon film (a-Si film) having an amorphous structure is formed by using a known method such as a plasma CVD method or a sputtering method. Thereafter, heat treatment (dehydrogenation annealing) for dehydrogenating the amorphous semiconductor film may be performed. Subsequently, the amorphous semiconductor film is crystallized by irradiating the amorphous semiconductor film with laser light, for example. As a result, a crystalline semiconductor film (here, crystalline Si film) is obtained. Thereafter, the crystalline semiconductor film is patterned to obtain the semiconductor layer 7.

Figure 6B:
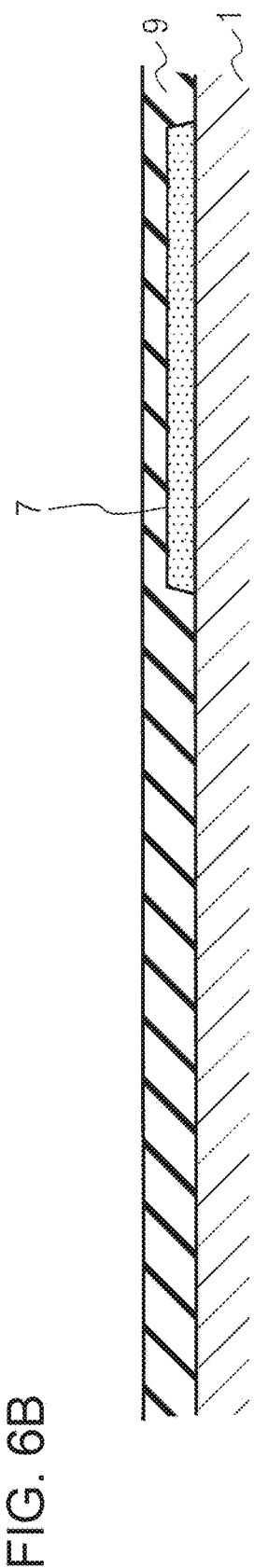
FIG. 6B is a step sectional view illustrating the method for manufacturing the active matrix substrate.

Next, as illustrated in FIG. 6B, a gate insulating layer (thickness: for example, 20 to 150 nm) 9 that covers the semiconductor layer 7 is formed. Here, as the gate insulating layer 9, for example, a silicon oxide film is formed by a plasma CVD method.

Figure 6C:
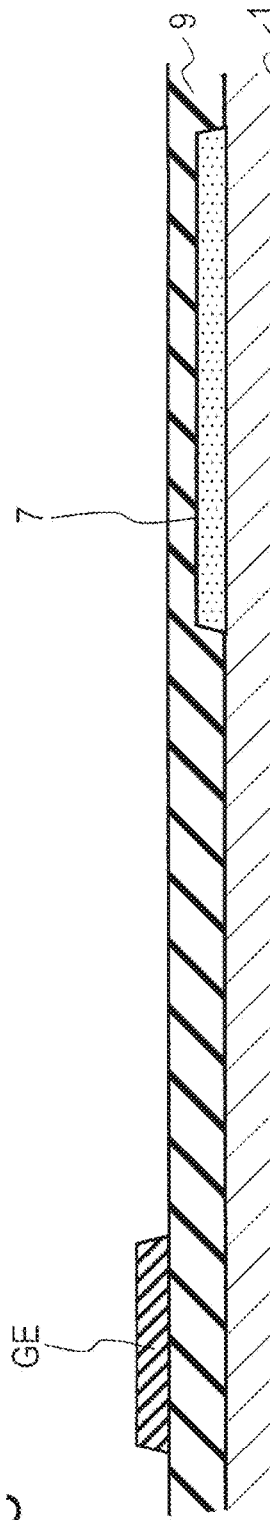
FIG. 6C is a step sectional view illustrating the method for manufacturing the active matrix substrate.

Thereafter, as illustrated in FIG. 6C, a gate metal layer GM including a gate electrode GE and a gate bus line GL (not illustrated) is formed on the gate insulating layer 9. The gate electrode GE is disposed so as to overlap a portion serving as a channel region of the semiconductor layer 7 when viewed from the direction normal to the substrate 1. The gate electrode GE may be connected to the corresponding gate bus line GL. For example, the gate electrode GE may be a portion of the gate bus line GL. After forming the gate electrode GE, an impurity (for example, n-type impurity such as phosphorus) is injected into the semiconductor layer 7, and subsequently, a heat treatment (activation treatment) for activating the ion-injected impurity is performed. As a result, a source region and a drain region, which are high-concentration impurity regions, are appropriately formed in the portions of the semiconductor layer 7 located on both sides of the channel region. The type and concentration of impurities can be selected to obtain the desired TFT structure and performances. An LDD region may be formed between the high-concentration impurity region and the channel region.

Figure 6D:
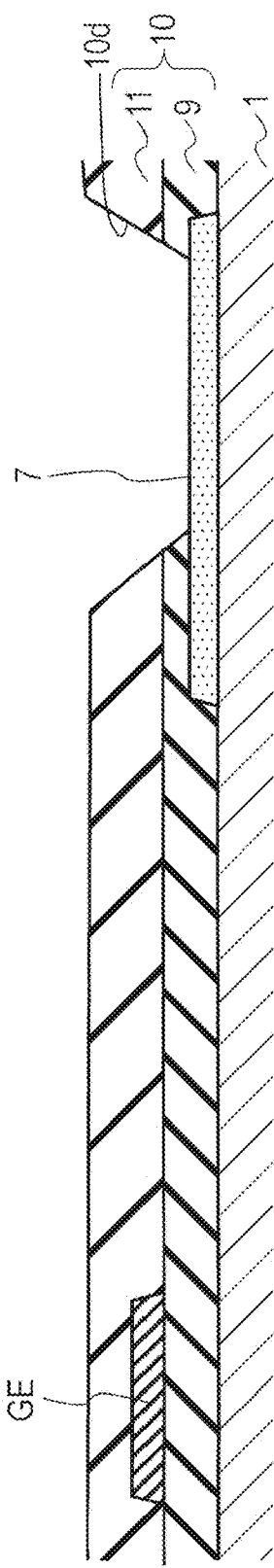
FIG. 6D is a step sectional view illustrating the method for manufacturing the active matrix substrate.

Next, as illustrated in FIG. 6D, an interlayer insulating layer (thickness: for example, 400 to 1000 nm) 11 is formed. Here, as the interlayer insulating layer 11, a stack of a silicon nitride film (thickness: about 160 nm) as a lower layer and a silicon oxide film (thickness: about 680 nm) as an upper layer is formed. Thereafter, for example, annealing is performed at 350° C. to 450° C. in a nitrogen atmosphere or a hydrogen mixed atmosphere to hydrogenate the semiconductor layer 7 to reduce crystal defects.

Subsequently, an insulating layer (lower insulating layer) 10 covering the semiconductor layer 7 is provided with a source opening portion (not illustrated) exposing the source region of the semiconductor layer 7 and a drain opening portion 10d exposing the drain region. In this example, the lower insulating layer 10 includes the interlayer insulating layer 11 and the gate insulating layer 9.

Figure 6E:
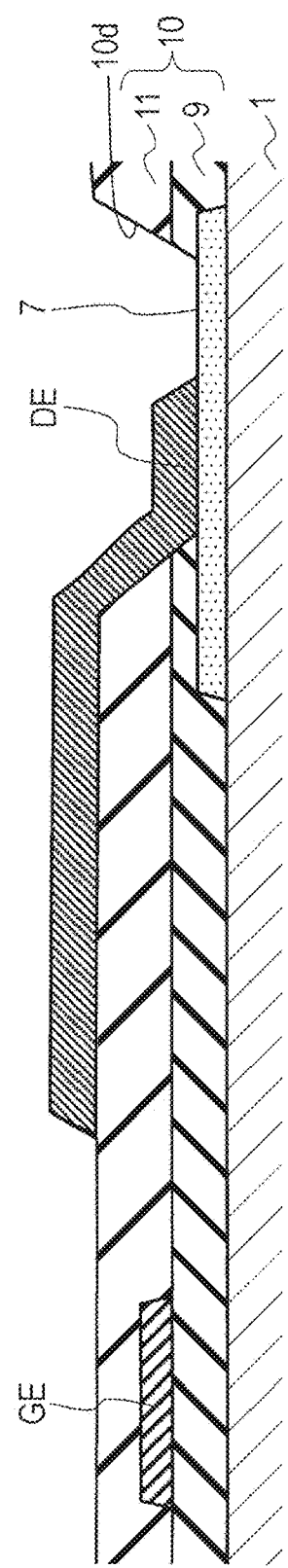
FIG. 6E is a step sectional view illustrating the method for manufacturing the active matrix substrate.

Thereafter, as illustrated in FIG. 6E, a conductive film for source is formed on the interlayer insulating layer 11, in the source opening portion, and in the drain opening portion 10d, and is patterned. Therefore, a drain electrode DE and a source metal layer SM including a source electrode and a source bus line (not illustrated) are obtained.

The source electrode is in contact with the source region of the semiconductor layer 7 in the source opening portion. The source electrode may be connected to the corresponding source bus line. For example, the source electrode may be a portion of the source bus line. The drain electrode DE is disposed so as to be in contact with the drain region of the semiconductor layer 7 in the drain opening portion 10d. The drain electrode DE may be disposed so as to be in contact with only a portion of the exposed portion of the semiconductor layer 7.

The material of the source electrode film is not particularly limited, and a film containing a metal such as aluminum (Al), tungsten (W), molybdenum (Mo), tantalum (Ta), copper (Cu), chromium (Cr), and titanium (Ti), or an alloy thereof, or a metal nitride thereof can be appropriately used.

Figure 6F:
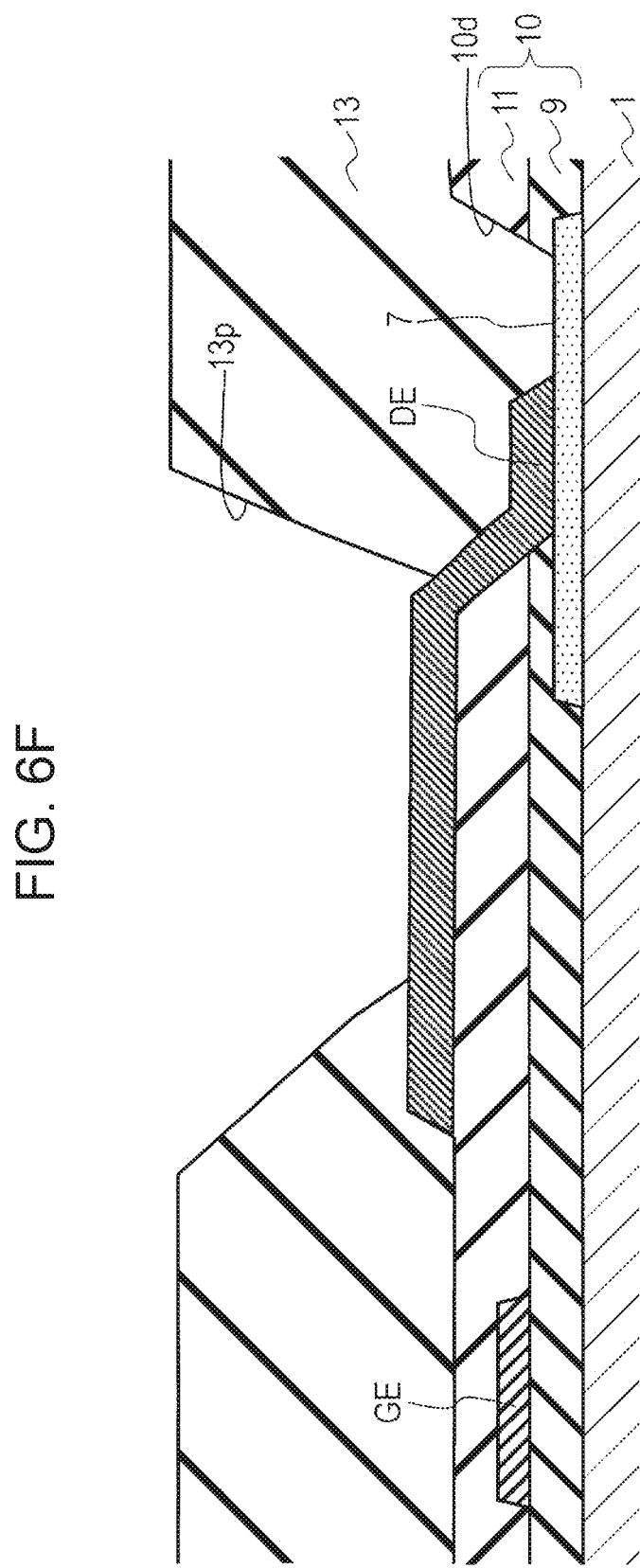
FIG. 6F is a step sectional view illustrating the method for manufacturing the active matrix substrate.

Next, as illustrated in FIG. 6F, a first insulating layer 13 covering the source metal layer SM is formed. Next, a first opening portion 13p exposing a portion of the drain electrode DE is formed in the first insulating layer 13. The first opening portion 13p is disposed so as not to overlap the bottom surface of the drain opening portion 10d. The first opening portion 13p may be disposed so as not to overlap either the bottom surface or the side surface of the drain opening portion 10d.

As the first insulating layer 13, an inorganic insulating layer (thickness: for example, 100 nm or more and 500 nm or less) and an organic insulating layer (thickness: for example, 1 to 3 μm, desirably 2 to 3 μm) may be formed in this order. The inorganic insulating layer may be a silicon oxide ($SiO_x$) layer, a silicon nitride ($SiN_x$) layer, or a silicon oxynitride ($SiN_xO_y$) layer. The organic insulating layer may be, for example, an organic insulating film (for example, acrylic resin film) containing a photosensitive resin material. Thereafter, the organic insulating layer is patterned to form an opening portion in the organic insulating layer. The portion of the organic insulating layer located in the non-display region may be removed.

Figure 6G:
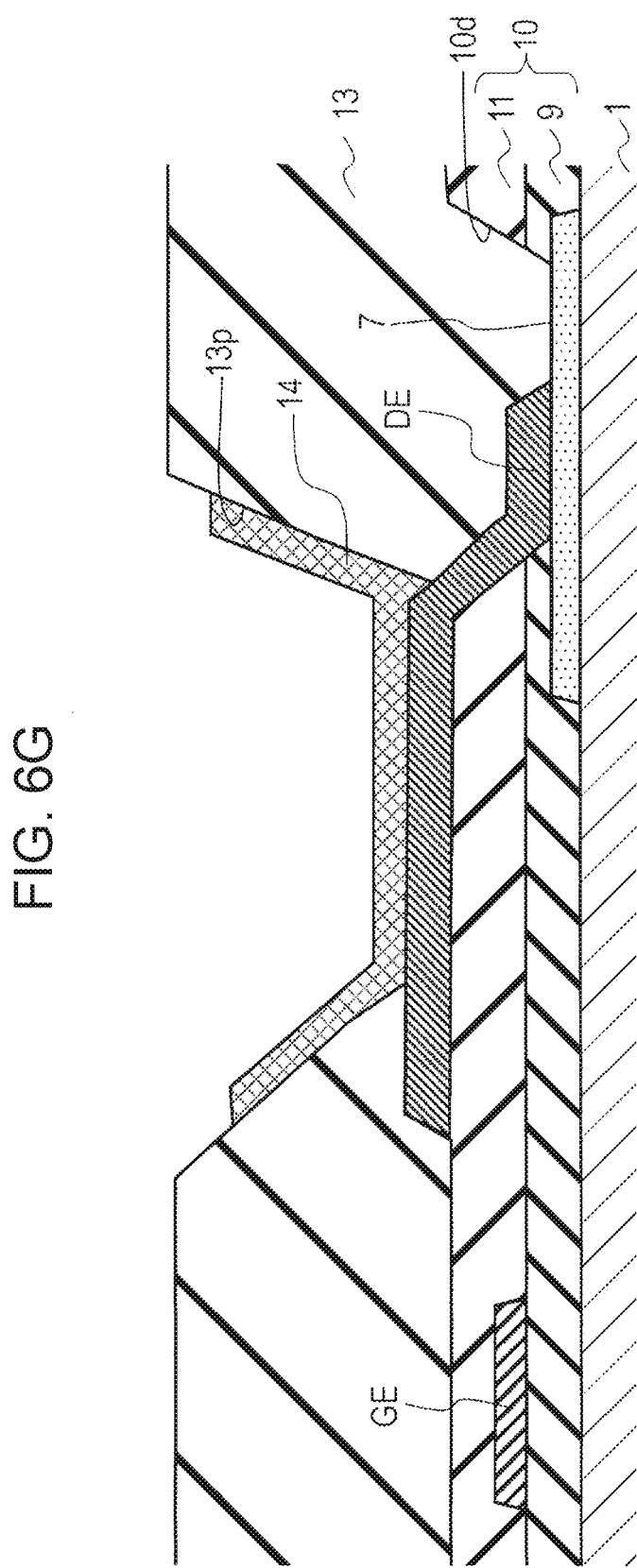
FIG. 6G is a step sectional view illustrating the method for manufacturing the active matrix substrate.

Subsequently, as illustrated in FIG. 6G, a conductive film for connecting electrode (thickness: 50 to 500 nm, for example) is formed on the first insulating layer 13 and in the first opening portion 13p, and patterned to form a connecting metal layer PXS including the connecting electrode 14 and the touch wire TL.

In a case where the active matrix substrate 101 is applied to a display device having no touch sensor function, auxiliary wiring for assisting the common electrode CE may be formed in the connecting metal layer PXS instead of the touch wire. Although not illustrated, in the non-display region of the active matrix substrate 101, the connecting portion formed in the connecting metal layer PXS may be used as a wiring connecting portion that connects wires in different metal layers or a terminal portion.

As the conductive film for connecting electrode, a conductive film using the material exemplified for the conductive film for gate or the conductive film for source can be used. Here, the Al film is formed by, for example, the sputtering method. The conductive film for connecting electrode may be a single layer film or a stack of films. For example, in a case where low resistance wiring such as a touch wire is not formed using the conductive film for connecting, the conductive film for connecting may be a transparent conductive film such as a metal oxide film.

Figure 6H:
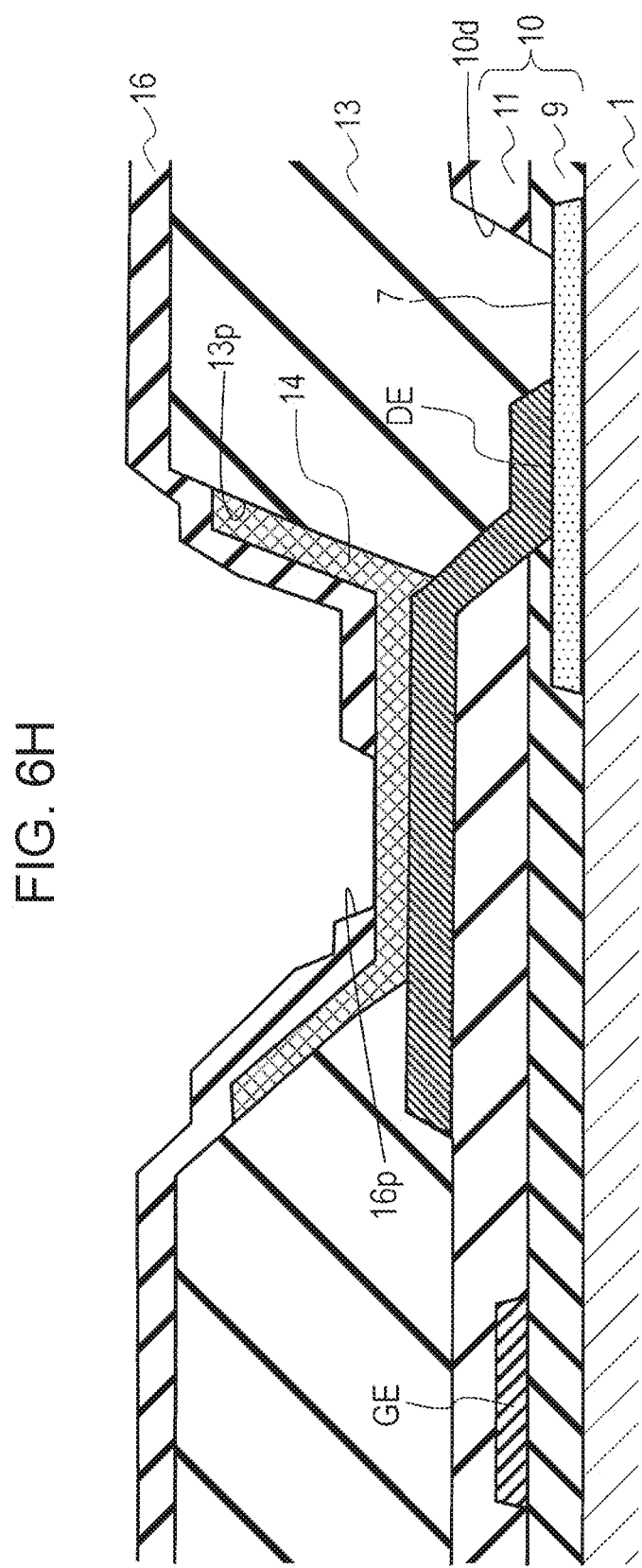
FIG. 6H is a step sectional view illustrating the method for manufacturing the active matrix substrate.

Thereafter, as illustrated in FIG. 6H, a second insulating layer 16 is formed so as to cover the connecting metal layer PXS, and the second insulating layer 16 is patterned to form a second opening portion 16p exposing a portion of the connecting electrode 14. As the second insulating layer 16, a silicon nitride film (thickness: 50 nm or more and 400 nm or less) is formed by, for example, the CVD method. Here, the second opening portion 16p is disposed in the first opening portion 13p so as not to overlap the bottom surface and the side surface of the drain opening portion 10d.

Figure 6I:
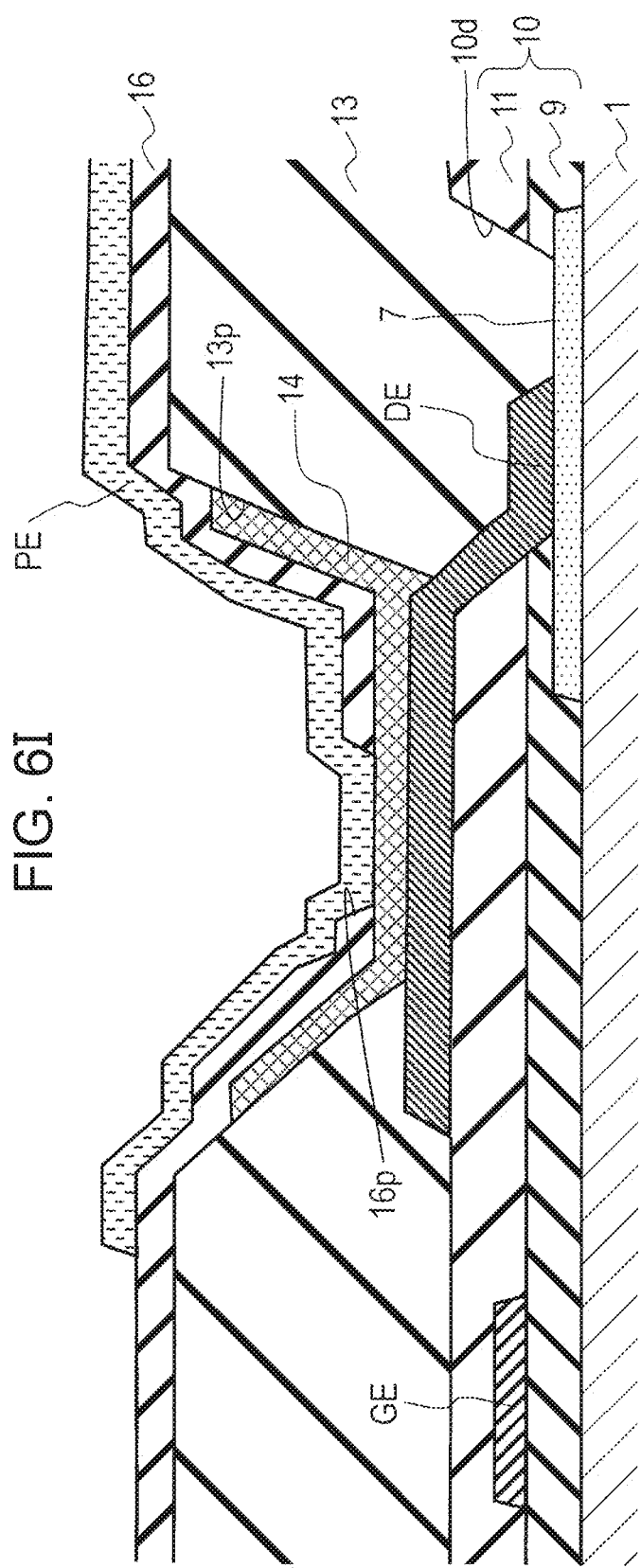
FIG. 6I is a step sectional view illustrating the method for manufacturing the active matrix substrate.

Next, a first transparent conductive film (thickness: 20 to 300 nm) is formed on the second insulating layer 16 and in the second opening portion 16p and patterned. As a material of the first transparent conductive film, a metal oxide such as indium-tin oxide (ITO), indium-zinc oxide, or ZnO can be used. As a result, as illustrated in FIG. 6I, the pixel electrode PE located on the second insulating layer 16 and in the second opening portion 16p and in contact with the connecting electrode 14 in the second opening portion 16p is obtained.

Next, as illustrated in FIG. 6J, after forming a dielectric layer (thickness: 50 to 500 nm) 17 so as to cover the pixel electrode PE, a common electrode CE is formed on the dielectric layer 17. As described above, the active matrix substrate 101 is manufactured.

As the dielectric layer 17, for example, a silicon nitride film (thickness: 50 nm or more and 500 nm or less) is formed by the CVD method.

The common electrode CE can be formed by forming a second transparent conductive film (thickness: 20 to 300 nm) on the dielectric layer 17 and performing patterning. The material exemplified for the first transparent conductive film may be used as the second transparent conductive film. In this example, the common electrode CE is disposed so as to cover the entirety of the pixel contact portion and the entirety of the drain contact portion 26. In each of the pixel regions, a slit or a notched portion is provided in the common electrode CE.

The common electrode CE may be divided into a plurality of segments by a slit. Each of the segments has a size corresponding to, for example, a plurality of pixel regions, and can be used as an electrode for a touch sensor.

Although the method for manufacturing the active matrix substrate 101 is described above as an example, the active matrix substrates 102 to 104 can also be manufactured by the same method as that of the active matrix substrate 101. When manufacturing the active matrix substrate 103, after forming a second insulating layer 16 so as to cover the connecting electrodes 14, and before patterning the second insulating layer 16, a common electrode CE having the opening portion 15p may be formed on the second insulating layer 16. Thereafter, a dielectric layer 17 is formed so as to cover the common electrode CE and the second insulating layer 16. Subsequently, the second insulating layer 16 and the dielectric layer 17 are simultaneously etched (using the same mask) to form a second opening portion 16p and a third opening portion 17p in the opening portion 15p of the common electrode CE. Next, a pixel electrode PE is formed on the dielectric layer 17, in the third opening portion 17p, and in the second opening portion 16p. As described above, by simultaneously patterning the second insulating layer 16 and the dielectric layer 17, it is possible to suppress an increase in the number of photomasks.

Although an example of using a crystalline silicon TFT as the TFT 20 is described above, the TFT 20 may be another silicon semiconductor TFT such as a microcrystalline silicon TFT or an amorphous silicon TFT. Alternatively, the TFT 20 may be an oxide semiconductor TFT having an oxide semiconductor layer such as an In—Ga—Zn—O-based semiconductor layer as an active layer. The TFT 20 is not limited to the top-gate TFT and may be a bottom-gate TFT.
Configuration of Display Device Next, an example of a display device including the active matrix substrate 101 will be described more specifically with reference to the drawings.

Hereinafter, an in-cell touch panel liquid crystal display device that performs display in the FFS mode will be described as an example. However, the display mode of the liquid crystal display device is not particularly limited. The liquid crystal display device does not have to be an in-cell touch panel.

FIG. 7 is a diagram illustrating an in-cell touch panel liquid crystal display device (hereinafter, "display device") 1000 according to the present embodiment.

The display device 1000 is provided with an active matrix substrate 101, a counter substrate 200 disposed on the viewer side of the active matrix substrate 101, and a liquid crystal layer 300 provided between the active matrix substrate 101 and the counter substrate 200.

As described above, the active matrix substrate 101 is provided with the TFT and the pixel electrode PE disposed in each pixel region, and the common electrode CE disposed with the pixel electrode PE and the dielectric layer therebetween. The common electrode CE is divided into a plurality of segments. Each of the segments also functions as the first touch sensor electrode 140. Each of the first touch sensor electrodes 140 is formed in a region including a plurality of pixel electrodes PE, for example. Each of the first touch sensor electrodes 140 is separated from the adjacent first touch sensor electrode by a slit.

Each of the first touch sensor electrodes 140 is connected to the touch wire TL configuring the touch sensor. The touch wire TL may extend so as to overlap the source bus line SL when viewed from the direction normal to the substrate 1.

The counter substrate 200 is provided with a substrate 201 and a color filter layer 203. A second touch sensor electrode 205 is provided on the liquid crystal layer 300 side of the color filter layer 203. One of the first touch sensor electrode 140 and the second touch sensor electrode 205 is a drive electrode of the touch sensor, and the other is a detection electrode.

When viewed from the direction normal to the display device 1000, the drive electrodes of the touch sensor may extend in the x direction and the detection electrodes may extend in the y direction intersecting the x direction. The intersecting portions of the drive electrodes and the detection electrodes each serve as touch detection units TU. Each of the touch detection units TU may be disposed corresponding to, for example, two or more pixels (not illustrated).

The display device 1000 is provided with a gate driver 41 that supplies a scanning signal to the TFT 20 provided in the pixel region via the gate bus line GL, a source driver 43 that supplies a pixel signal to the TFT 20 via the source bus line SL, a drive electrode driver 45 that supplies a drive signal to the drive electrode of the touch sensor, and a touch detection portion 47 that receives a signal supplied from the detection electrode of the touch sensor to detect a touch. In this specification, a configuration in which at least one of these circuits 41, 43, 45, and 47 is not provided, and the active matrix substrate 101 and the counter substrate 200 are bonded to each other with the liquid crystal layer 300 therebetween may also be referred to as an in-cell touch panel display device.

The configuration and driving method of the in-cell touch panel display device are disclosed in, for example, International Publication No. 2015/059995 by the present applicant. For reference, the entire contents disclosed in International Publication No. 2015/059995 are incorporated herein.

The active matrix substrate according to the present embodiment can be applied to a display device that does not have a touch sensor function. In a case where low resistance metal auxiliary wiring for assisting the common electrode CE is provided on the active matrix substrate, the connecting electrode 14 may be formed of the same metal film as that of the metal auxiliary wiring.

The embodiments of the present disclosure are widely applied to various liquid crystal display devices including the active matrix substrate, an in-cell touch panel display device, an image capturing apparatus such as an image sensor device, an electronic device such as an image input device and a fingerprint reading device, and the like.

The present disclosure contains subject matter related to that disclosed in U.S. Provisional Patent Application No. 62/926,593 filed in the US Patent Office on Oct. 28, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An active matrix substrate that includes a display region having a plurality of pixel regions, the active matrix substrate comprising:
   a substrate;
   a thin film transistor supported on the substrate, and disposed in association with each of the pixel regions;
   a pixel electrode disposed above the thin film transistor in each of the pixel regions;
   a pixel contact portion that electrically connects the pixel electrode to the thin film transistor in each of the pixel regions; and
   a common electrode disposed above the thin film transistor so as to at least partially overlap the pixel electrode of each of the pixel regions with a dielectric layer therebetween, and electrically separated from the pixel electrode, wherein
   the thin film transistor includes a semiconductor layer, a gate electrode, a gate insulating layer disposed between the semiconductor layer and the gate electrode, a source electrode, and a drain electrode, and the drain electrode is disposed on the semiconductor layer with a lower insulating layer therebetween, and is in contact with a portion of the semiconductor layer in a drain opening portion formed in the lower insulating layer,
   the pixel contact portion in each of the pixel regions includes
     the drain electrode,
     a first insulating layer that covers the drain electrode,
     a connecting electrode in contact with the drain electrode in a first opening portion formed in the first insulating layer,
     a second insulating layer that covers the connecting electrode, and
     the pixel electrode in contact with the connecting electrode in a second opening portion formed in the second insulating layer,
   a transparent capacitor portion including the pixel electrode, the common electrode, and the dielectric layer located between the pixel electrode and the common electrode is formed on the second insulating layer, and
   when viewed from a direction normal to the substrate, in each of the pixel regions,
     a drain contact region where the drain electrode and the semiconductor layer are in contact with each other in the drain opening portion does not overlap either a first contact region where the connecting electrode and the drain electrode are in contact with each other in the first opening portion or a second contact region where the pixel electrode and the connecting electrode are in contact with each other in the second opening portion,
     an entirety of the second contact region overlaps the first contact region, and
     the transparent capacitor portion at least partially overlaps the first contact region.

2. The active matrix substrate according to claim 1, further comprising:
   a plurality of gate bus lines that extend in a first direction and a plurality of source bus lines that extend in a second direction intersecting the first direction, wherein
   the gate electrode in the thin film transistor is electrically connected to corresponding one of the plurality of gate bus lines and the source electrode is electrically connected to corresponding one of the plurality of source bus lines, in each of the pixel regions, and
   the first contact region and the second contact region in the pixel contact portion are disposed between the corresponding one of the plurality of gate bus lines and the drain contact region when viewed from the direction normal to the substrate.

3. The active matrix substrate according to claim 2, wherein
the drain electrode covers only a portion of the drain opening portion in each of the pixel regions when viewed from the direction normal to the substrate, and
a portion of the semiconductor layer exposed by the drain opening portion includes a first portion in contact with the drain electrode and a second portion in contact with the first insulating layer, and the first portion is located closer to a pixel contact portion than the second portion.

4. The active matrix substrate according to claim 1, wherein
the pixel electrode is located closer to the substrate than the common electrode, and when viewed from the direction normal to the substrate, the transparent capacitor portion overlaps an entirety of the first contact region and the entirety of the second contact region in the pixel contact portion in each of the pixel regions.

5. The active matrix substrate according to claim 1, wherein
the common electrode is located closer to the substrate than the pixel electrode, and when viewed from the direction normal to the substrate, the transparent capacitor portion partially overlaps the first contact region and does not overlap the second contact region in the pixel contact portion in each of the pixel regions.

6. The active matrix substrate according to claim 1, wherein
an entirety of a bottom surface of the first opening portion in the first insulating layer overlaps an upper surface of the drain electrode in the pixel contact portion when viewed from the direction normal to the substrate.

7. The active matrix substrate according to claim 1, wherein
an entirety of a bottom surface of the second opening portion in the second insulating layer overlaps an upper surface of the connecting electrode in the pixel contact portion when viewed from the direction normal to the substrate.

8. The active matrix substrate according to claim 1, wherein
the first contact region of the pixel contact portion does not overlap either a bottom surface or a side surface of the drain opening portion when viewed from the direction normal to the substrate.

9. The active matrix substrate according to claim 1, wherein
the common electrode is divided into a plurality of segments, and each of the segments functions as an electrode for a touch sensor.

10. The active matrix substrate according to claim 9 further comprising:
a plurality of touch wires disposed on the first insulating layer, wherein
each of the plurality of touch wires is electrically connected to corresponding one of the plurality of segments, and
the connecting electrode in the pixel contact portion is formed by using a conductive film identical with a conductive film of the plurality of touch wires and is electrically separated from the plurality of touch wires.

11. The active matrix substrate according to claim 1, wherein
the gate electrode does not overlap the drain electrode when viewed from the direction normal to the substrate.

12. The active matrix substrate according to claim 1, wherein
the gate electrode at least partially overlaps the drain electrode when viewed from the direction normal to the substrate.

13. The active matrix substrate according to claim 1, wherein
either a bottom surface of the first opening portion or a bottom surface of the second opening portion does not overlap a bottom surface of the drain opening portion when viewed from the direction normal to the substrate.

14. An in-cell touch panel display device comprising the active matrix substrate according to claim 1.

* * * * *